United States Patent Office 2,790,327
Patented Apr. 30, 1957

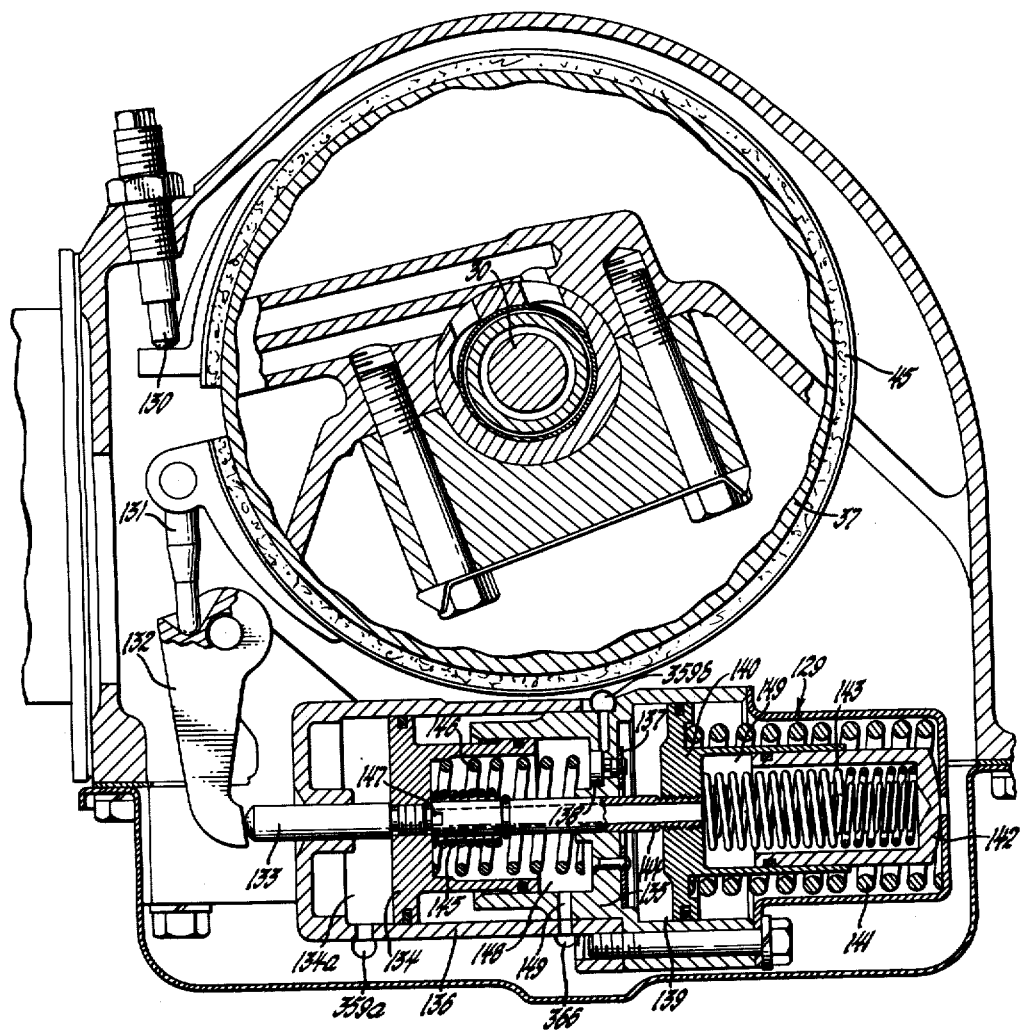

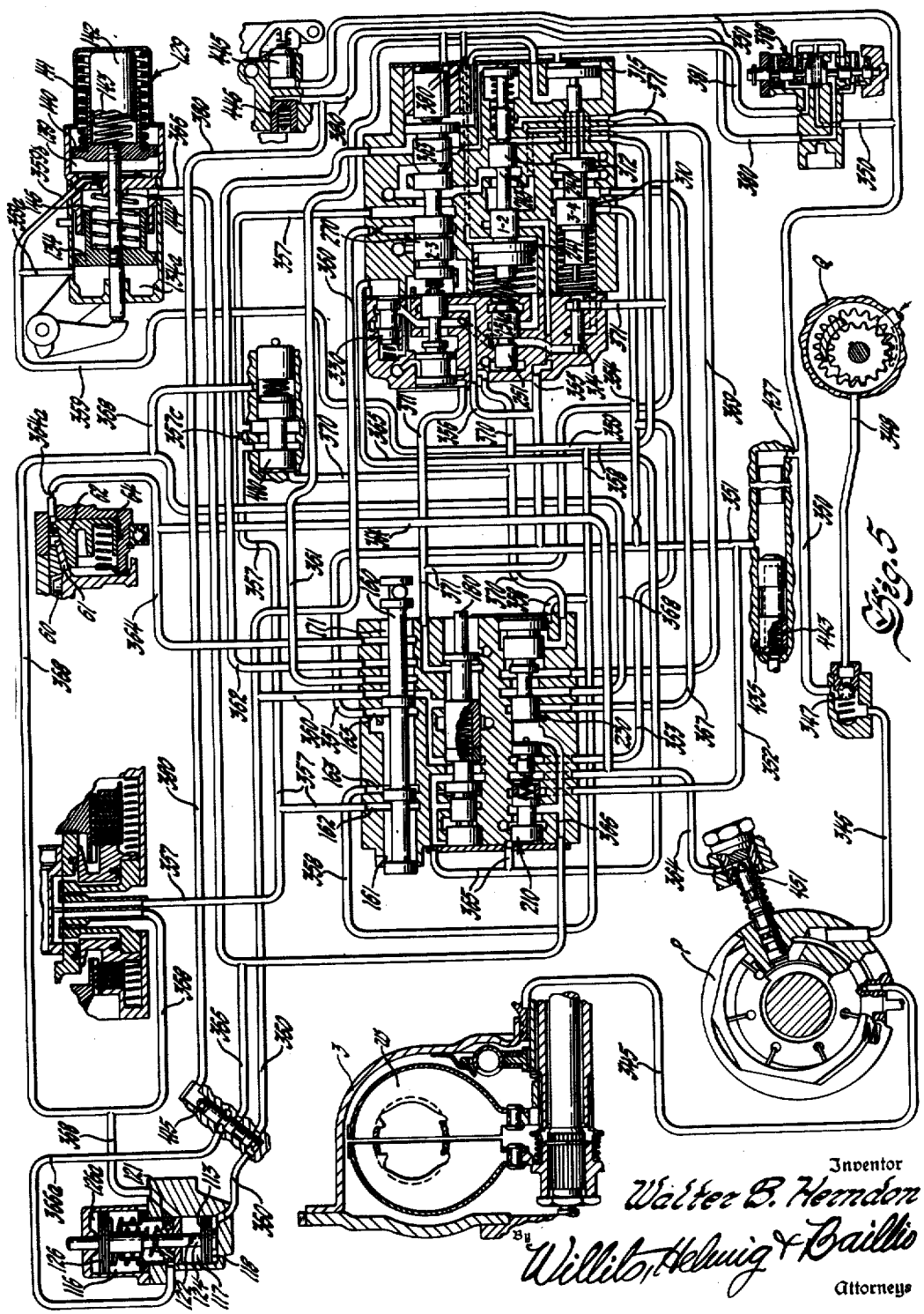

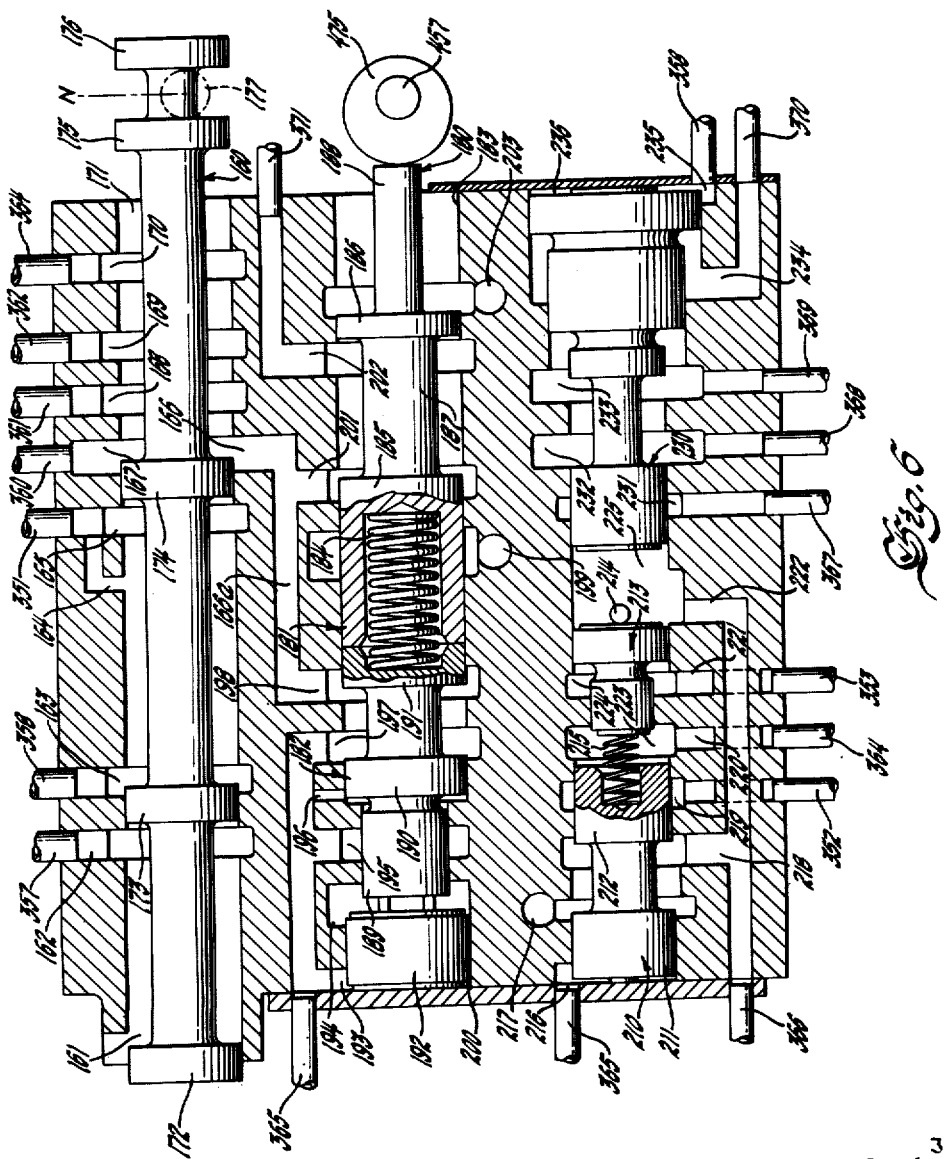

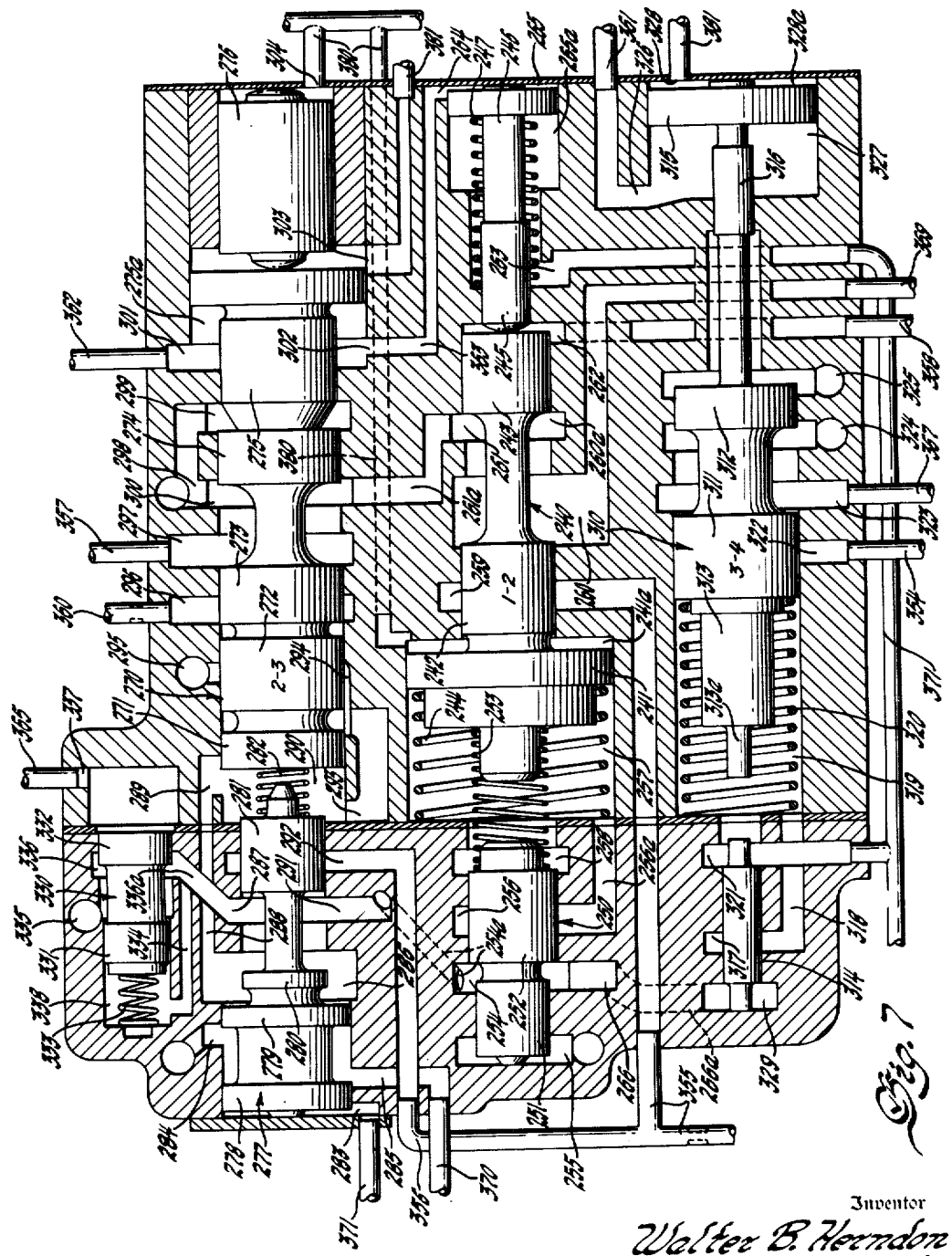

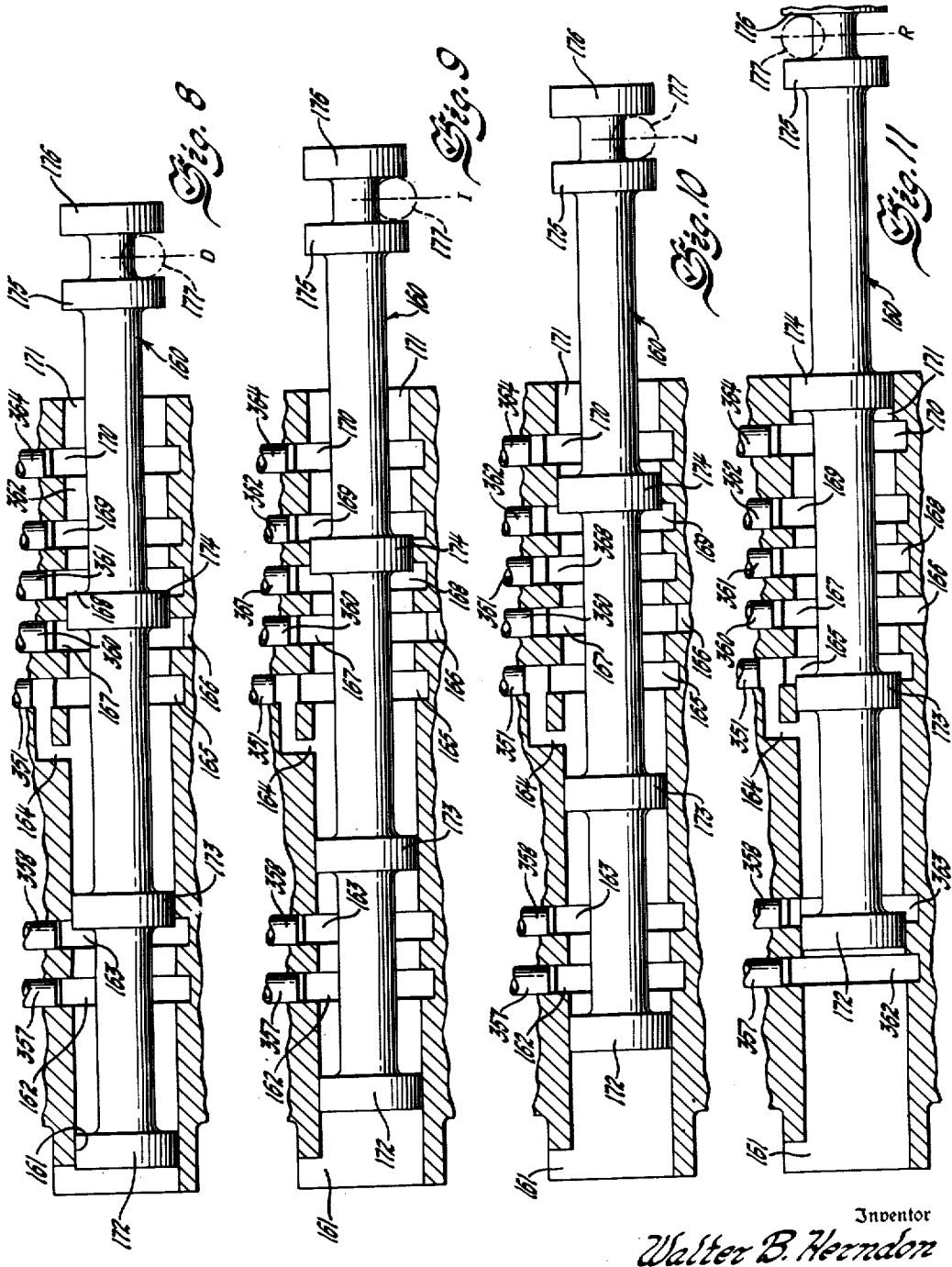

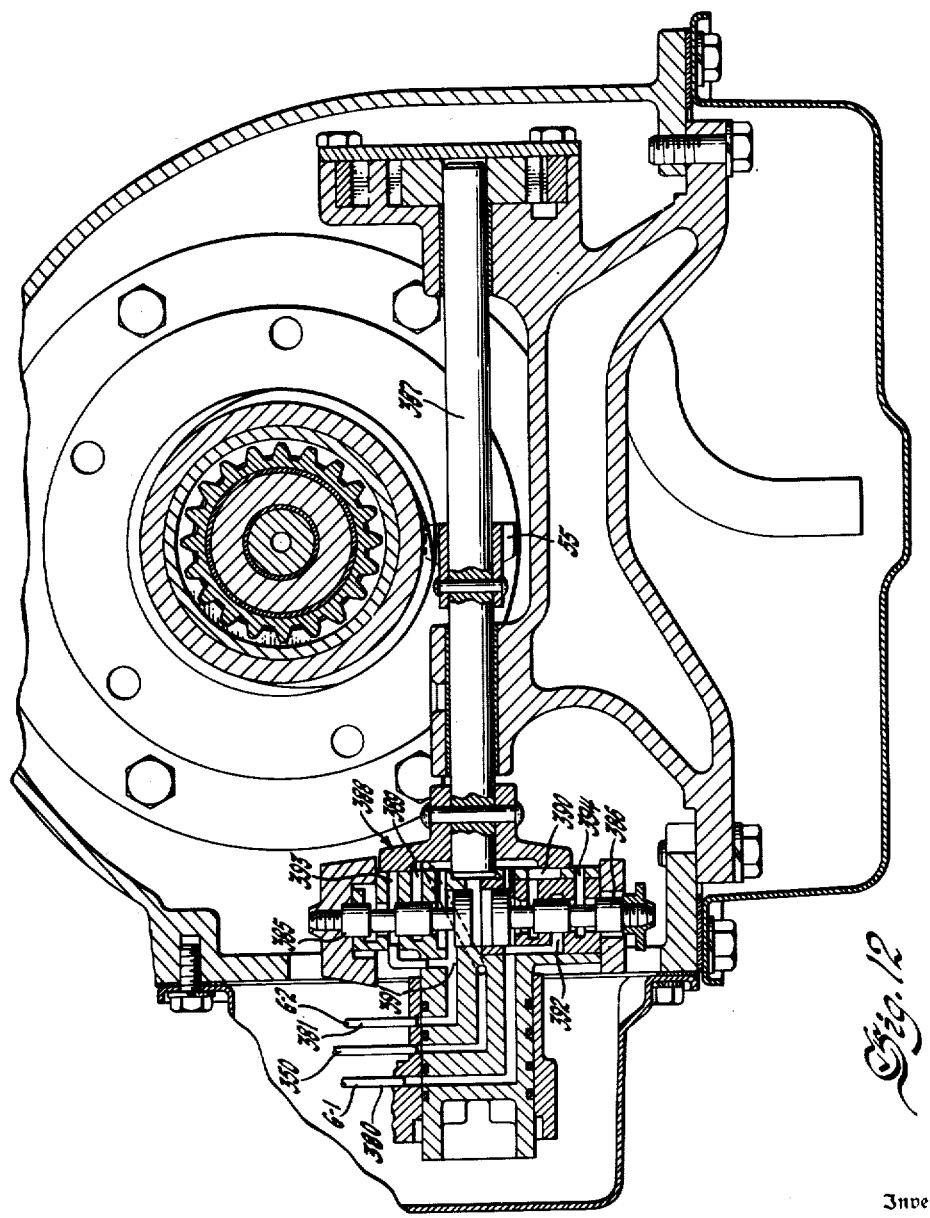

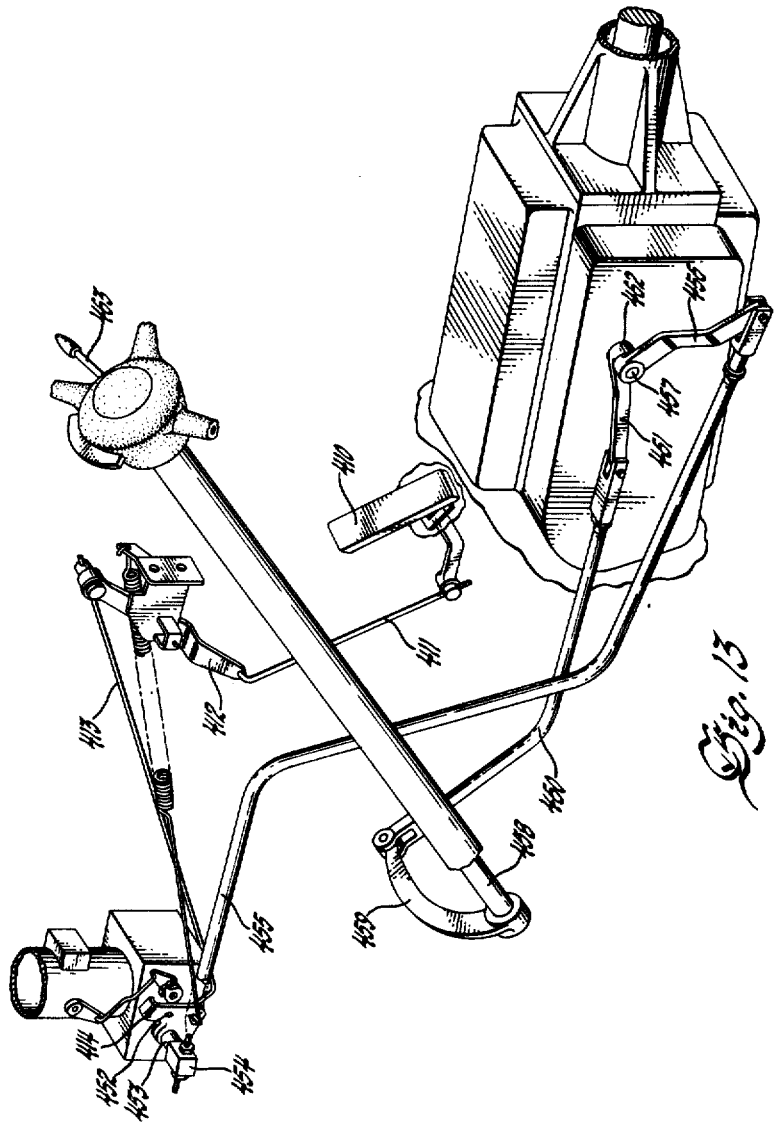

2,790,327
TRANSMISSION CONTROL SYSTEM

Walter B. Herndon, Rochester, Mich., assignor to General Motors Corporation, Detroit, Mich., a corporation of Delaware Application July 5, 1951, Serial No. 235,213

34 Claims. (Cl. 74—472)

This invention relates to controls for change speed gearing transmissions, and in particular to improved controls for such transmissions in motor driven vehicles. It is directed to improvements in control systems of the type wherein independently acting automatic and manual control members are coordinated to produce automatic selection of gear ratio in step-ratio gearing. The invention represents a number of improvements in such control systems whereby a plurality of speed ratio ranges may be selected to meet the particular requirements of different drive conditions encountered in the operation of a motor vehicle.

The invention provides for completely automatic shifting within each range for which the transmission control system is set.

The invention further provides for forced downshift of the gear ratio under control of the vehicle operator in each range of operation for which the control system is set.

An object of this invention is to provide an automatic vehicle transmission and control system therefor constructed and arranged to be operated in any one of a plurality of gear ratio ranges as selected by the vehicle operator, in which each gear ratio range includes at least two gear ratios and providing for automatic shift of gear ratio in the range selected by the vehicle operator.

Another object of this invention is to provide an automatic vehicle transmission and control system constructed and arranged to be operated in any of a plurality of gear ratio ranges as selected by the vehicle operator, one of said ranges providing for two forward gear ratios, the second of said ranges providing for three forward gear ratios, and the third of said ranges providing for four forward gear ratios, and providing for automatic shift of gear ratio in the range selected by the vehicle operator.

A further object of this invention is to provide an automatic transmission and control system constructed and arranged to be operated in any of a plurality of gear ratios as selected by the vehicle operator, one of said ranges providing for normal second gear ratio start and automatic downshift to first gear ratio, another of said ranges providing for normal first gear ratio start and automatic upshift to second and third gear ratios, and the third of said ranges providing for normal first gear ratio start and automatic upshift to second, third and fourth gear ratio.

A further object of the invention is to provide for forced downshift under the control of the driver as expressed by the position of the vehicle accelerator pedal in each range of operation for which the transmission is set.

Another object of this invention is to provide in a transmission control system having shift valves automatically controlled by governor pressure proportional to vehicle speed and a metered pressure determined by vehicle throttle setting, a regulator valve effective to cut off the last-mentioned pressure from the shift valves when the metered pressure falls below a predetermined pressure level.

Still another object of this invention is to provide in a control system of the type described, a line exhaust valve responsive to main line pressure and effective upon a drop of main line pressure below a predetermined value to provide an auxiliary exhaust port whereby the main pressure feed line for the control system may be more rapidly exhausted.

A further object of this invention is to provide in a control system of the class described and having a fluid pressure responsive servo member for applying a band to a planetary gearing drum, a main line pressure passage connected to said servo member for applying said band to said drum, a metered pressure passage connected to said servo member for assisting said main line pressure in applying said band to said drum, and a valve controlled by a pressure which varies in accordance with vehicle speed for connecting the pressure assist passage to main line pressure at a predetermined vehicle speed.

These and other objects and advantages of the invention will be apparent from the following specification and claims, taken in conjunction with the accompanying drawings, in which:

Figure 4 is a similar cross-section taken at 4—4 of Figure 2 to show the fluid pressure actuator device for the rear unit reaction brake.

Figure 5 is a schematic control diagram of the fluid pressure control system, wherein the friction torque-sustaining members and their actuators of the preceding figures are shown at the top of the drawing, the ratio control valving in the center, and the pump supply portion of the system and hydraulic governor at the bottom.

Figure 6 is an enlarged view of the manually operable valve, throttle valve, compensator valve, and double transition valve to illustrate the valve details.

Figure 7 is an enlarged view of the shift valve assemblies to illustrate the details thereof.

Figure 8 is an enlarged view of the manual valve of Figure 5, illustrating the valve as positioned for driving range condition of transmission operation.

Figure 9 is an enlarged view of the manual valve of Figure 5, illustrating the valve as positioned for intermediate range condition of transmission operation.

Figure 10 is an enlarged view of the manual valve of Figure 5, illustrating the valve as positioned for low range condition of operation.

Figure 11 is an enlarged view of the manual valve of Figure 5, illustrating the valve as positioned for reverse condition of operation.

Figure 12 is a cross-sectional view of the governor and its drive mechanism, the cross-drive shaft appearing in Figure 2.

Figure 13 is a view of the driver's control mechanism for controlling the manual valve and throttle valve.

Figure 1:
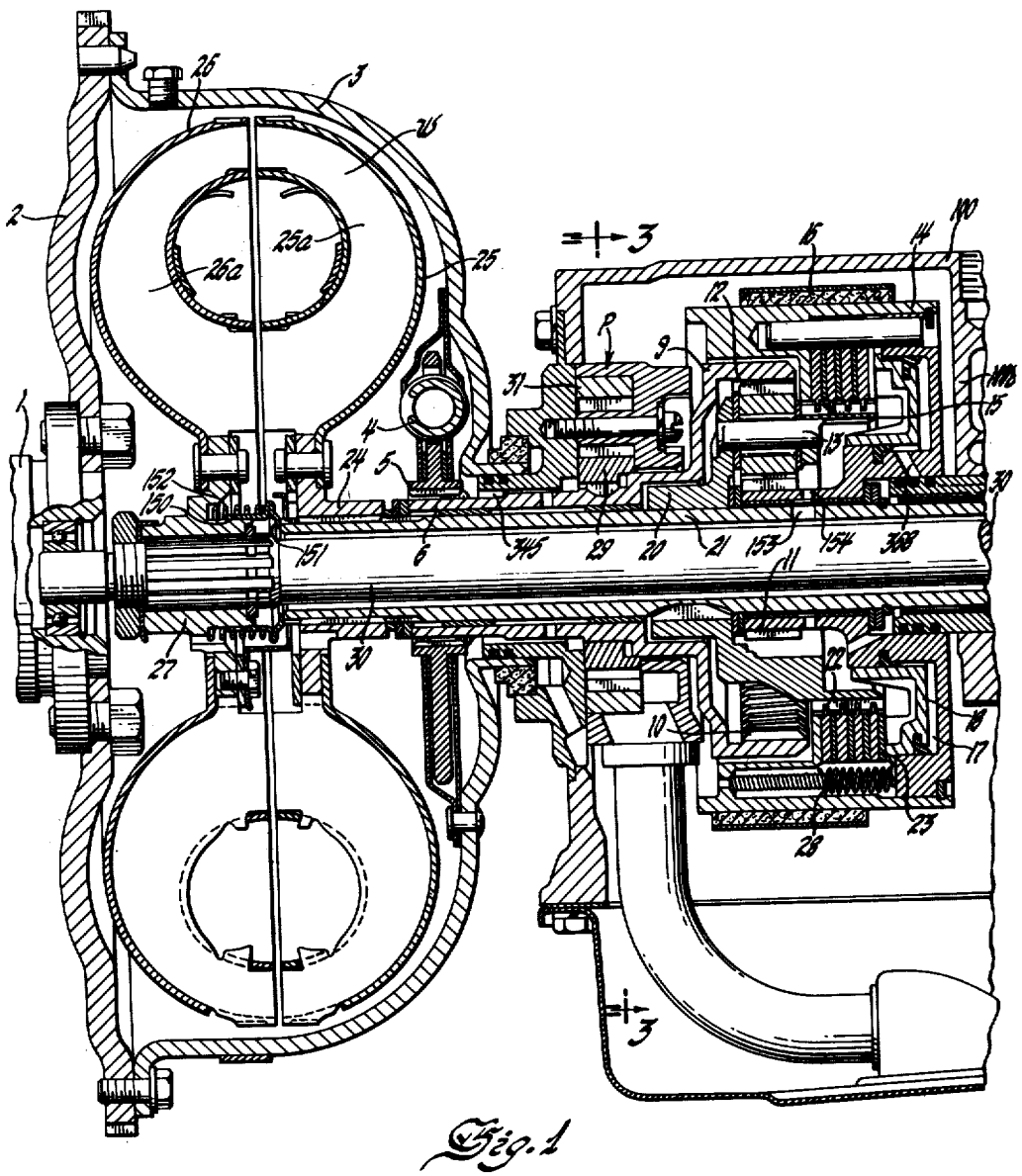
Figures 1 and 2 are adjoined vertical sections of the transmission drive mechanism.
Figure 2:
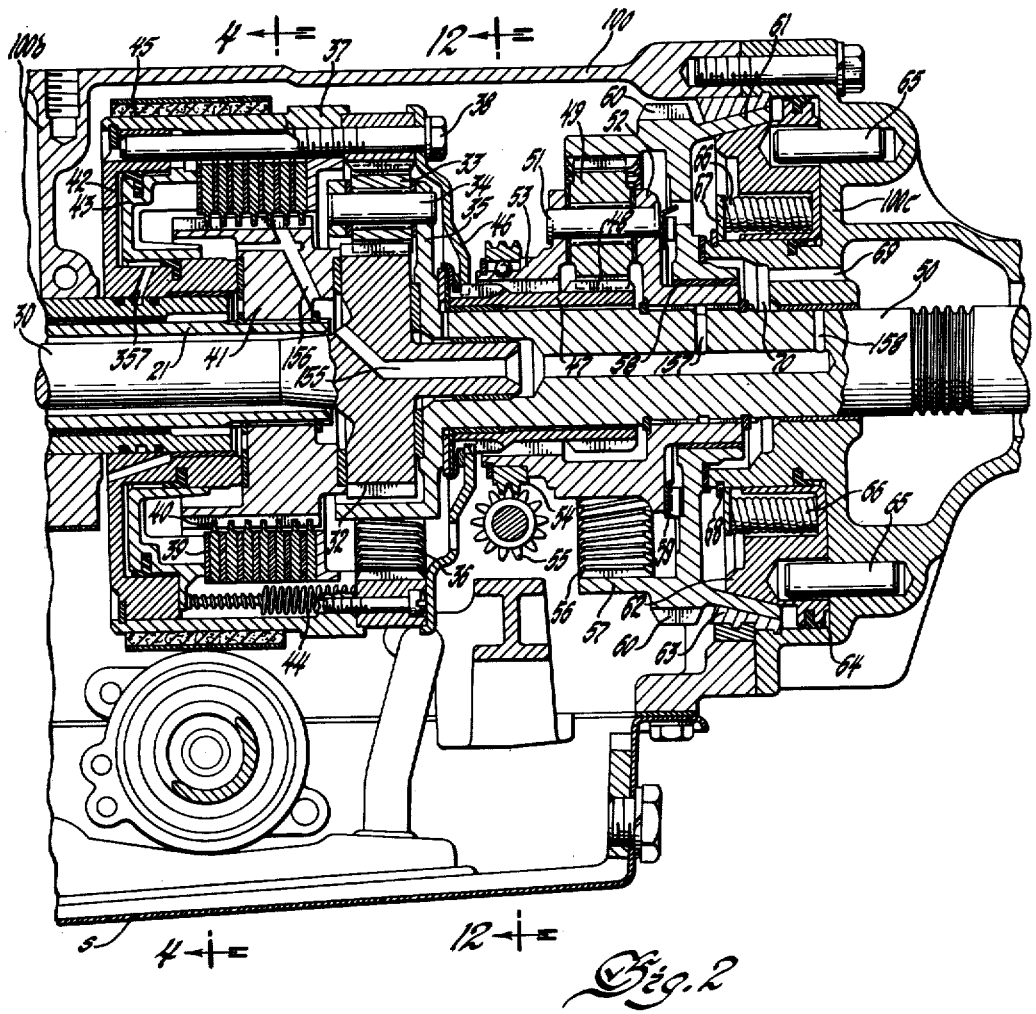

The drive structure of the transmission is shown in section in companion Figures 1 and 2. Engine shaft 1 is bolted to flywheel plate 2 fastened to drum 3 connected by vibration damper device 4 to hub 5 splined to hollow shaft 6, which is keyed to drive the rotor 29 of variable capacity pump P, and formed at the right into drum 9 having internal gear teeth 10 meshing with planet gears 12 meshed with a sun gear 11. The planets 12 are supported upon spindles 13 of carrier 20 of shaft 21, the right-hand portion 15 of the carrier being formed to accommodate clutch plates 22 mating with plates 23 carried by drum 14 of sun gear 11. This gear group is referred to as the front unit, and is made operative by application of band 16 to drum 14 of sun gear 11, or by engaging the clutch plates 22—23.

The right-hand inner wall of drum 14 is recessed to form an annular cylinder space 17 for clutch piston 18, fed by pressure in passage 368.

The forward extension of hollow shaft 21 is splined to the hub 24 of fluid flywheel impeller 25, facing turbine 26 to form a fluid turbine working space W. Hub 27 of turbine 26 is splined to the forward end of transmission shaft 30. Impeller 25 carries blades 25a while turbine 26 supports blades 26a. Clutch 22, 23 is disengaged by springs 28 supported in the left wall of drum 14.

Hollow shaft 6 is keyed to a gear 29 adapted to drive a gear 31 of engine driven pump P used to supply fluid pressure to the control system.

The casing web 100b divides the transmission radially, and supports the shafting as shown, while affording passage space for the fluid servo and pressure feed connection.

In Figure 2, the gear group 32, 33, 36, is dealt with as the rear unit, and shaft 30 is integral with sun gear 32 meshed with planet gears 33 supported upon spindles 34 of carrier 35 integral with output or load shaft 50. Internal gear 36 meshed with planets 33 is attached to drum 37 which is equipped with key bolts 38 for clutch plates 39 mating with plates 40 keyed to drum 41 splined on the rear portion of shaft 21.

The forward wall of drum 37 is recessed to form an annular cylinder space 42 for piston 43, and spring 44 serves to disengage plates 39 and 40 when chamber 42 is connected to exhaust.

The rear unit ratio is determined by alternate application of band 45 to drum 37 of annulus gear 36, or engagement of clutch 39, 40. The clutch engaging and holding pressure is delivered by passage 357 to chamber 42.

The gear unit at the right of Figure 2 is for providing reverse rotation of shaft 50. The plate 46 is splined to the forward portion of sleeve 47 of sun gear 48 which meshes with planet gears 49 supported on spindles 51 of carrier 52 splined to shaft 50.

Reverse carrier unit 52 is splined to shaft 50, and has effixed planet spindles 51, and the forward half 53 of carrier 52 is fixed to speedometer and governor drive gear 54, meshing with speedometer and governor drive gear 55. The planet gears 49 on spindles 51 mesh with sun gear 48, the sleeve extension 47 of which is splined to plate 46, and also mesh with annulus gear 56 of drum 57 supported for axial movement on bearing sleeve 58, and for abutment against thrust washer 59.

Parking brake teeth 60 are cut on the periphery of drum 57, ad the drum is formed into the brake cone 61 at the right, operable to be braked by piston 62 against backing cone 63 keyed to the housing 100.

The brake cone 61 is applied when the manual selector valve 160 of Figure 5 is placed for "reverse," as shown in Figure 8, and a parking brake pawl member, not shown, carries teeth adapted to engage teeth 60 when the manual selector 463 of Figure 13 is placed in reverse and the vehicle is standing still with the engine turned off. When teeth of the parking brake pawl (not shown) engage teeth 60, drum 57 is locked against rotation, this action providing a parking brake for the vehicle.

The teeth of sun gear 48, planets 49 and annulus gear 56 are cut helically for quiet running and for providing a torque thrust operable to apply a self-energized brake action to cone 61, when there is initial braking force applied by piston 62.

Assuming that the teeth of annulus gear 56 and planet gears 49 are cut with a right-hand helix angle, and that the effect of delivered torque to drum 57 and sun gear 48 applies rotation of the sun gear 48, for reverse drive of output carrier 52, the annulus gear 56 in attempting to rotate forwardly, meets the resistance of friction on the cone surfaces of cone 61 and elements 62 and 63. Because of the resultant thrust of the helix angle between the teeth of planet gears 49 and annulus gear 56, the annulus gear 56 receives a thrust to the left toward the forward end of the transmission and this thrust is applied to cone 61 as a braking effort adding to the thrust applied by piston 62. This action compresses the wavy spring 59. The design helix angle for these gears may be taken according to engineering standards, but it is preferred to have the self-energizing brake force lie between 18 and 30 percent of the total cone braking force.

When the vehicle is decelerated during reverse drive, the self-energizing action is reversed, and the annulus gear 56 endeavors to move to the right assisted by spring 59, while the piston 62 retains the fluid pressure actuation force on cone 61. It will be seen that upon deceleration, such as occurs when the driver relaxes the engine accelerator pedal, the device is ready to apply a reverse brake release force to the cone 61 the instant the pressure fluid which is holding piston 62 applied is released.

The arrangement prevents slamming of the torque-sustaining elements, prevents sudden build-up of torque, and contributes to smoothness of operation, particularly noticeable when rocking the car in low speed, forward or reverse out of a soft traction spot.

The annular piston 62 is recessed in the cylinder space 64 of casing 100, and is guided on pins 65 and held against rotation forces. Brake release springs 66 recess in pockets formed in piston 62 and are retained by annulus disc 67 held against leftward motion by lock ring 68.

Axial openings 69 in the web 100c of casing 100 drain oil from space 70 back to the transmission sump. Oil pressure is supplied to cylinder space 64 behind piston 62 by means of a passage 364 (see Figure 5) as will hereafter be more fully explained.

Figure 3:
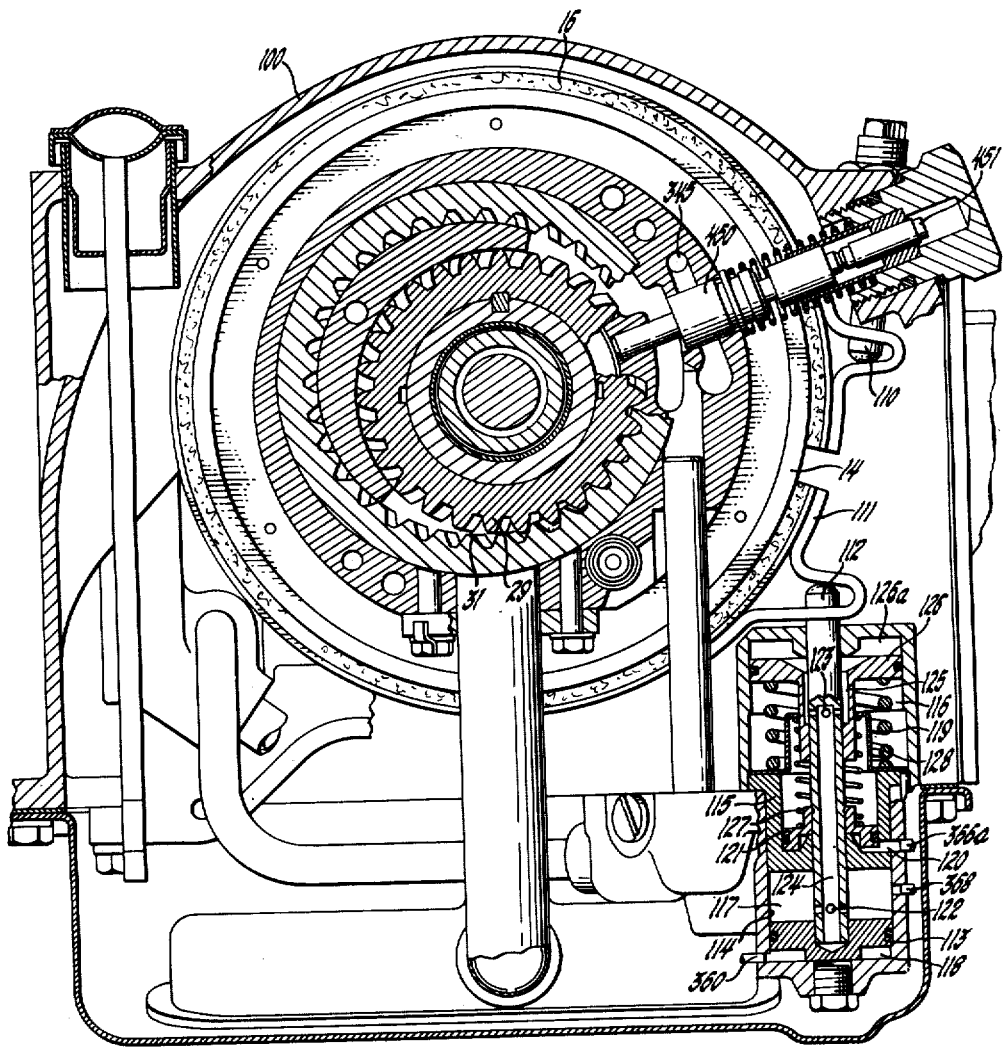
Figure 3 is a cross-section of the transmission taken at 3—3 of Figure 1, to show one of the servo pumps and line pressure regulator valving, and to show the fluid pressure actuator device for the front unit reaction brake.

In Figure 3 the front band and servo mechanism is illustrated. Band 16 is self-sprung to clear drum 14, and is supported in casing 100 by an adjustable anchor 110, and actuated at its movable end 11 by a rod 112 fixed to piston 113 sliding in cylinder 114. The central web 115 of cylinder 114 separates chamber 116 from chamber 117. Piston 113 moves up under influence of fluid pressure fed to chamber 118 through passage 360.

Under "neutral" control, no pressure is applied to front unit cylinder space 118 and spring 119 holds the piston 113 in brake releasing position. Under drive, intermediate, low and reverse settings of the manual valve 160 of Figures 5 and 8 through 11, line pressure from pump supply line 351 will be admitted to passage 360 and chamber 118 to bias the front band servo toward its band apply position.

Figure 14:
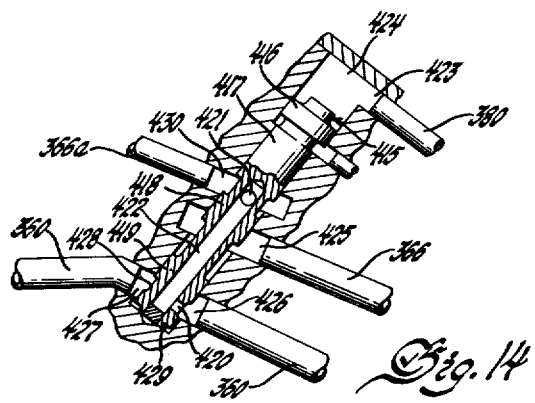
Figure 14 is an enlarged sectional view of the front unit band servo control valve.

Compensator pressure, which is a metered pressure controlled by the position of the vehicle accelerator pedal 410 of Figure 13, is fed via passage 366 to a control front band valve 415 of Figures 5 and 14, and when valve 415 is in its raised position this compensator pressure is admitted to chamber 120 of the front band servo of Figure 3 via passage 366a, the compensator pressure acting upon piston 121 to assist the line pressure in applying the band. When the valve 415 is in its "down" position illustrated in Figure 14 line pressure from passage 360 is admitted to passage 366a and chamber 120, assisting line pressure in chamber 118 to apply the band. The valve 415 is controlled by governor pressure as hereafter more fully explained.

Brake releasing pressure is fed by passage 368 to chamber 117 of the front band servo of Figure 3 and passes through ports 122 to ports 123 in hollow stem 124, and out through ports 125 to apply thrust upon the upper face of piston 126 (see Figure 3). Piston 121 fixed to rod 112 is held downward in space 120 by a spring 127 retained by member 128. The combined effective areas of pistons 113 and 126 is greater than that of pistons 121 and 113, hence the pressure in passage 368 acts to release the band 16.

In Figure 4, the rear unit band 45 is self-sprung to release from drum 37, and is held by adjustable anchor 130, and movable strut 131 loaded by rocker 132 is shifted clockwise by the thrust of piston rod 133, of piston 134. The piston 134 is of two-step form. The central web 135 of the cylinder 136 is equipped with a check valve 137 of the blade type, operable by plunger 138.

The main line pressure for releasing the rear unit band is furnished to passage 359 and by branch passage 359a to chamber 134a, and by branch passage 359b to the left of check valve 137 to enter chamber 139 so as to apply a right-hand thrust to piston 140. The latter is loaded by brake-applying spring 141. The skirt of piston 140 at the right, slides outside of spring retained cap 142, the springs 143 bearing against the under face of piston 140. A tubular portion 144 of piston 140 extends to the left as a thrust spacer element, bearing against piston 134. Buffer spring 145 prevents slamming of 144 against piston 134. Spring 146 is fastened to travel with piston 134 and abuts the web 135 at a given travel point to add the spring resistance to the rightward motion of piston 134 when the brake releasing force is fed to line 359a. Stem 144 is hollow and is provided with an opening 147 leading to chamber 148 and provides communication at the right to chamber 149. This permits compensator pressure supplied to line 366 to act in chambers 148 and 149 to thrust pistons 134 and 140 to the left, thereby assisting the springs in applying the rear band.

The pump supply system is worthy of brief examination. The passage 345 in Figure 3 is a pressure feed passage leading from pump pressure control valve 450 to the interior of drum 3 of Figure 1 to maintain the working space W of the fluid flywheel filled. Referring to Figure 1, the rearward projection of hub 27 is fitted with a valve 150 having a radial lip 151 on the folded portion, of greater net effective area than the forward portion on which spring 152 seats. Rise of pressure in working space W acts differentially upon lip 151 and the folded portion, against the face of calibrated spring 152, to slide the valve 150 to the left at a predetermined pressure, and expose flow space 153 between the hub and the forward end of shaft 21 open to the longitudinal space between shafts 21 and 30. Drop of working space pressure permits spring 152 to seat valve 150 against the end of shaft 21.

The oil passing through valve 150 to the space between the shafts is delivered to lubricate the transmission through passages indicated at 153, 154 in Figure 1 and 155, 156, 156, 157 and 158 in Figure 2. The oil is supplied by engine driven pump P and tail shaft driven pump Q of Figure 5. The lubricating oil from the lubricated parts returns to sump S for recirculation.

The gear train combination of the front and rear units provides for four forward speed ratios and reverse by actuation of the friction torque sustaining elements, brakes and clutches, in the following pattern in which "X" indicates actuation.

|  | Front Unit | | Rear Unit | | Reverse Unit Brake 61 |
|---|---|---|---|---|---|
|  | Brake 16 | Clutch 22–23 | Brake 45 | Clutch 39–40 |  |
| First | X |  | X |  |  |
| Second |  | X | X |  |  |
| Third | X |  |  | X |  |
| Fourth |  | X |  | X |  |
| Reverse | X |  |  |  | X |

In first or the lowest gear ratio, the front unit band 16 is applied by fluid pressure in chamber 118 beneath piston 113, while the rear unit brake 45 is applied by the force of springs 141, 146. Compensator pressure from line 366 acts in chamber 120 upon piston 121 to assist the pressure in chamber 118 to apply the front band. This compensator pressure is a function of engine throttle opening, and may vary from zero when the throttle is closed to line pressure, when the throttle is open. The compensator pressure also assists the rear band apply springs to prevent slippage of the rear band. The compensator pressure in passage 366 is supplied to chamber 148 of the rear band apply servo to act upon piston 134 and to chamber 149 to act upon piston 140 through hollow stem 144.

The carrier 20 of the front unit is a power output member, and transmits drive in the reduction ratio of the front unit through the fluid flywheel 25, 26 to the input power member, sun gear 32, of the rear unit, when the sun gear 11 is held by band 16. The fluid flywheel 25, 26 couples the two units at the variable slip ratio determined by the torque of shaft 30 and the speed of hollow shaft 21.

In the second gear ratio, brake 16 is released while clutch 22, 23 is being engaged to set up a 1–1 locking couple in the front unit, the hollow shaft 21 now driving impeller rotor 25 at engine speed. The drive train in low and second is a series drive, front unit to rear unit, as coupled by the fluid flywheel 25, 26. Rear unit band 45 remains engaged in second gear.

For drive in third gear ratio, the front unit clutch 22, 23 is released and front band 16 re-applied, and the rear unit brake 45 is released while clutch 39, 40 is actuated. The drive train now divides the torque of hollow shaft 21, one component being sustained by the fluid flywheel 15, 26, and the other by clutch 39, 40. In the rear unit these torque components are combined, the first being delivered by the sun gear 32, and the second by annulus gear 36 to drive output connected carrier 35.

Drive in fourth gear is obtained by release of brake 16 of the front unit, while actuating front clutch unit 22—23. The torque of the engine on hollow shaft 21 is divided, one fraction being delivered by fluid flywheel 25, 26 to sun gear 32 at a speed averaging between 3 to 5 percent differential to that of annulus gear 36 which rotates at engine speed.

In the first to reverse transition, the following pattern of actuation occurs:

|  | Front Unit | | Rear Unit | | Reverse Unit Brake 61 |
|---|---|---|---|---|---|
|  | Brake 16 | Clutch 22–23 | Brake 45 | Clutch 39–40 |  |
| First | X |  | X |  |  |
| Reverse | X |  |  |  | X |
| First | X |  | X |  |  |

The carrier 52 of the reverse unit being connected to the load shaft 50, and the annulus gear 36 of the rear unit connected by radial web 46 to the reverse unit sun gear 48, the application of engine torque at a torque multiplication to central shaft 30 and to rear unit sun gear 48 first furnishes a backward rotation component to annulus gear 56, since the rear unit carrier 52 is stopped or at low rotational speeds. With reverse unit annulus gear 56 stopped by cone 61, the reverse component applied by reverse unit sun gear 48 causes planets 49 to roll around the annulus gear 56 in reverse direction, applying reverse torque to reverse unit carrier 52. As soon as reverse rotation of shaft 50 occurs, the reverse unit carrier 52 partakes of the reverse rotation and the full reverse ratio of the combination becomes effective. The fluid flywheel 25, 26 furnishes all of the reverse drive torque.

The control system for actuating the various brake bands and clutches to select the transmission gear ratio shown in Figure 5 includes a manual valve 160, shift valves 240, 270 and 310, a throttle valve 180, compensator valve 210, a double transition valve 230, a throttle valve regulator valve 330, a timing valve 400, a front band servo control valve 415 and a system exhaust valve 435. A governor 388 provides two pressure level outputs for exerting a force tending to upshift the shift valves and is also connected to deliver pressure to the front band servo control valve 415, and to reverse blocker piston 446. Throttle valve 180 delivers fluid pressure to the regulator plugs of the first to second shift valve 240, the third to fourth shift valve 310 and to the second to third shift valve 270, such throttle valve pressure tending to "downshift" the valves in opposition to the effect of governor pressure tending to upshift the valves. The compensator valve 210 delivers pressure to the rear servo unit 129, tending to assist the servo apply springs 141 and 146 to prevent slipping of the rear band 45 and also delivers pressure to the double transition valve 230, such pressure tending to maintain the double transition valve 230 in its down position. In addition, compensator pressure is directed to the front band servo control valve 415. Pump line pressure from passage 351 is constantly directed to the intake port of the compensator valve 210, to one side of the compensator valve regulator plug 213 (see Fig. 7), to the intake ports of the first to second and third to fourth shift valves 240 and 310 and to port 292 of the second to third shift valve regulator plug 277 (see Fig. 7). Line pressure is also constantly directed to the intake ports 165 and 166 of the manual valve 160 (see Fig. 6).

In operation, the manual valve may be positioned for "neutral," drive range, low range, intermediate range or reverse condition of operation.

MANUAL VALVE

The details of the manual valve are shown in Figure 8, wherein manual valve 160 is illustrated as having been positioned by the manual selector lever 463 on the vehicle steering column (see Figure 13) to condition the transmission for drive range operation. As shown, the valve bore is provided with eleven ports, these being numbered from left to right are, exhaust port 161, port 162 communicating with rear clutch apply passage 357, port 163 communicating with passage 358, pressure feed ports 164 and 165 each communicating with main line pressure feed passage 351, throttle valve feed valve port 166 leading to throttle valve feed passage 166a (see Fig. 6), port 167 leading to front band apply passage 360, port 168 leading to passage 361, port 169 leading to passage 362, port 170 leading to reverse cone clutch apply passage 364, and exhaust port 171. The valve body is provided with three lands 172, 173, and 174 adapted to cooperate with the various ports, depending upon the position of the valve body in the valve bore. A reduced portion extends between each of the lands for fluid communication purposes. A fourth land 175 is spaced from land 176, there being a pin 177 intermediate the lands for moving the valve in response to movement of range selector control handle 425 of Figure 13.

With the manual valve positioned for drive range operation as shown in Figure 8, land 172 blocks off exhaust port 161 at the left end of the valve bore. Pump line pressure from feed passage 351 is admitted to front band apply passage 360 by way of port 167. Line pressure is likewise admitted to pressure feed passage 166a (see Figure 6) of the throttle valve 180 by way of port 166. Passages 361, 362, and 364 are exhausted to the transmission sump by way of exhaust port 171 at the right-hand end of the valve bore.

In Figure 9, the valve is illustrated as being positioned for intermediate range operation. The action is the same as heretofore described with the exception that pressure from pressure feed passage 351 is admitted to passage 361. Passages 362 and 364 are still exhausted to sump through exhaust port 171.

In low range position, as shown in Figure 10, the manual valve admits line pressure from feed passage 351 to passage 362, for reasons hereafter more fully explained. Reverse cone apply passage 364 is connected to exhaust port 171.

When the manual valve is positioned for reverse operation as shown in Figure 11, land 174 blocks off exhaust port 171, while land 172 prevents communication between passages 357 and 358. Line pressure is admitted to reverse cone apply passage 364.

THROTTLE VALVE

In Figure 6 there is shown a pressure metering valve 180, hereafter termed a throttle valve, the function of which is to deliver a variable pressure to a compensator valve 210 and to the transmission shift valve 240, 270 and 310 as hereafter more fully explained. The throttle valve 180 is controlled by the vehicle accelerator pedal through means of an accelerator pedal operated cam 475, the pressure level of the pressure delivered by the valve 180 (hereafter termed throttle valve pressure) varying from zero when the engine throttle is closed to line pressure when the throttle is open.

The throttle valve 180 is formed of two sections 181 and 182 positioned in a bore 183 for sliding movement. A spring 184 is interposed between sections 181 and 182, being operative to permit relative motion of the two sections with respect to each other. Section 181 includes lands 185 and 186 joined by reduced portion 187 and a stem 188 protruding outwardly from the end of the bore to contact cam 475. Section 182 includes lands 189, 190 and 191, the land 190 being of greater diameter than land 189. A regulator plug 192 is positioned between one end of the valve bore and land 189. The valve bore is provided with ports 193–203. Ports 193, 194, 195, 196, 197, 198, 199, 201, 202 and connects throttle valve pressure delivery passage 365 to chamber 200 at one end of plug 192. Port 194 exhausts to sump. Port 195 connects throttle valve pressure delivery passage 365 to the valve bore adjacent land 189. Port 196 connects throttle valve pressure delivery passage 365 to the space between lands 189 and 190. Port 197 connects the throttle valve pressure delivery passage 365 to the valve bore. Ports 198 and 201 connect to line pressure supply passage 166a controlled by the manual valve 160. Port 199 exhausts to sump. Port 202 connects to forced downshift passage 371 and port 203 exhausts to sump.

The throttle valve pressure delivered to the shift valves is regulated in accordance with amount of throttle opening by the following mechanism. Referring to Fig. 6, as the accelerator pedal 410 opens the throttle, the cam 475 moves the section 180 of the throttle valve to the left, compressing spring 184 and urging section 182 (carrying land 190) to the left, tending to open communication into the line 365 which delivers throttle valve pressure to the shift valves. Pressure in passage 365 opposes this movement by urging plug 192 to the right, establishing an equilibrium pressure dependent on the force of the spring 184 and hence on accelerator pedal position.

COMPENSATOR VALVE

The compensator valve 210, shown in detail in Figure 6 is used to supply a metered pressure as determined by throttle valve pressure, to the rear band apply servo 129, this metered compensator pressure acting to assist the rear band apply springs to prevent slippage of the brake unit 145 under high torque transfer conditions of operation.

The compensator valve body 210 is slidably positioned in the valve bore 210a, the body consisting of lands 211 and 212, there being a reduced section intermediate the lands. A compensator regulator plug 213 in the bore acts against a pin 214. A spring 215 normally urges the valve body 210 and regulator plug 213 into spaced relationship with respect to each other. The valve bore is provided with seven ports 216, 217, 218, 219, 220, 221, 222, operatively associated with the compensator valve 210 and compensator regulator plug 213. Port 216 admits throttle valve pressure to the left end of the compensator valve 210, this throttle valve pressure from passage 365 acting to urge the compensator valve 210 to the left toward the compensator regulator plug 213 and tending to compress spring 215. Port 217 is an exhaust port leading to the transmission sump. Port 218 is the compensator output port whereby compensator pressure is admitted to passage 366. Port 219 is fed by line pressure from passage 352. Port 220 connects to passage 364, so that line pressure is admitted to chamber 223 when the manual valve 160 is placed in reverse. This line pressure in chamber 223 will cause the compensator valve 210 to move to the left and exhaust all compensator pressure through port 217, irrespective of the effect of throttle valve pressure when the manual valve 160 is placed in reverse. The throttle valve pressure, in forward speed ratios, acts upon the compensator valve 210 to cause the valve to meter compensator pressure to passage 366. Port 221 communicates with passage 353, admitting line pressure to chamber 224, when line pressure exists in passage 353. This line pressure acts upon the regulator plug 213 to tend to force the plug against pin 214. Port 222 communicates with compensator pressure passage 366 to admit compensator pressure to chamber 225. This compensator pressure in chamber 225 tends to move the regulator plug 213 away from pin 214 and also acts upon the end of double transition valve 230, tending to position the double transition valve in its right hand position.

DOUBLE TRANSITION VALVE

Positioned in the same bore and in alignment with the compensator valve 210 is a double transition valve 230. This valve is positioned in its "down" position illustrated in Figure 6 for first and second gear ratio operation, and is moved to its "up" position for third and fourth gear ratio operation. In addition to compensator pressure admitted through port 222 to act on the left end of the valve, five ports are associated with the double transition valve 230. Port 231 connects to passage 367 leading to the third to fourth shift valve 310. Port 232 communicates with front clutch apply-front band release passage 368. Port 233 connects to passage 369 leading to port 260 of the first to second shift valve 240. Port 234 connects to passage 370 leading to port 406 of timing valve 400 (see Figure 15). Port 235 admits line pressure from rear band release passage 358 to chamber 236. Thus, whenever line pressure is admitted to passages 357, 358 and 359 to release the rear band, this line pressure acts upon the double transition valve 230 to move the valve to its up position.

SHIFT VALVES

Referring to Figure 7, the first to second shift valve 240 includes a piston 241, land 242, and land 243, all formed as a unit with a reduced portion intermediate the lands. A spring 244 yieldably urges the shift valve to its right hand position shown in Figure 7. A pair of regulator plugs 245 and 246 are disposed in a bore at the right of the shift valve and act upon the valve body 240 under the influence of pressure fluid as hereafter more particularly explained. A spring 247 yieldably biases plug 246 to its right hand position. A regulator plug 250 is disposed in a bore to the left of the shift valve, the latter regulator plug including a pair of lands 251 and 252 joined by a reduced portion. The two lands of the regulator plug 250 are of differential area. A spring 253 disposed between the regulator plug 250 and the first to second shift valve body 240 yieldably urges the regulator plug 250 to the left position illustrated in Figure 7. The porting associated with the regulator plug 250 and shift valve 240 admits pressure to the valve 240 to cause shifting as hereafter more fully explained. Port 254 permits throttle valve pressure from passage 254a to act upon the differential area of the two sections of the regulator plug to force the regulator plug inwardly against spring 253. This action tends to delay upshift of the valve 240. Port 255 exhausts to the transmission sump. Port 256 permits throttle valve pressure to enter chamber 257 and act on piston 241, the pressure connection being established between passage 256a when the throttle valve pressure forces the regulator plug 250 to its right hand position against spring 253. Port 258 is an exhaust port leading to the transmission sump. Port 259 communicates with feed line pressure passage 355, which passage constantly receives pressure fluid from the pumps. Port 260 communicates with passage 369 leading to port 233 of the double transition valve 230. Port 261 communicates with passage 261a, which passage in turn communicates with the port 300 of the second to third shift valve 270. Port 262 communicates with passage 358. Port 263 connects to passage 371. Port 264 admits pressure from passage 363 and port 302 of the 2nd to 3rd shift valve plug 275 to chamber 265 to the right of regulator plug 246. Port 266 admits throttle valve pressure from passage 254a to passage 266a. The inter-action of these various pressures on the 1st to 2nd shift valve 240 is hereafter more particularly explained.

SECOND TO THIRD SHIFT VALVE

The second to third shift valve 270 is made up of four lands 271, 272, 273 and 274, there being a reduced sections intermediate each of the lands. A pair of governor plugs 275 and 276 are disposed in the valve bore to the right of the shift valve body 270. Governor plug 275 is a differential area type of plug. A regulator plug 277 composed of four land portions 278, 279, 280 and 281 joined by reduced sections is disposed in a regulator plug bore coaxial with the shift valve bore to the left of the valve 270. A spring 282 disposed intermediate regulator plug 277 and valve body 270 yieldably urges the shift valve 270 to its right hand position (for second gear ratio) and the regulator plug 277 to its left hand position. Port 283 admits line pressure from passage 371 to the left of regulator plug 277, tending to force the regulator plug to the right and compressing spring 282. Port 284 exhaust to the transmission sump and port 285 connects to passage 370. Ports 286 and 287 cooperate to admit throttle valve pressure to passage 288 when the regulator plug 277 is in its left hand position as shown in Figure 7. Passage 288 communicates with port 289 to admit pressure to chamber 290. Port 291 admits throttle valve pressure to passage 254a and to port 254 of the first to second regulator plug 250. Port 292 communicates with line pressure passage 356. Long port 293 terminates in chamber 290 and communicates with port 294 connecting to exhaust port 295. Port 296 connects to front band apply passage 360. Port 297 connects to rear clutch apply passage 357. Ports 298 and 299 exhaust to sump. Port 300 connects to passage 261a leading to port 261 of the first to second shift valve 240. Port 301 connects to passage 362, leading to port 169 of the manual valve 160. Port 302 connects to passage 363 leading to port 264 of the first to second shift valve regulator plug 246. Port 303 connects to governor delivery passage 381, and port 304 connects to governor delivery passage 380. The interaction of the pressures upon the second to third shift valve 270 will hereafter be more fully explained.

THIRD TO FOURTH SHIFT VALVE

The third to fourth shift valve 310 is formed of a pair of lands 311 and 312 joined by a reduced section. A boss 313 extends to the left from land 311, there being a nipple 313a on boss 313. This nipple is adapted to contact a throttle valve regulator plug 314 under certain conditions of operation. A governor plug 315, at the right of the valve 310, urges the valve to the left by a pin 316.

Pressure in throttle valve passage 266a acts upon regulator plug 314 tending to force the plug toward nipple 313a. Port 317 communciates with passage 318 to admit throttle valve pressure to chamber 319 under certain conditions of operation. A spring 320 in chamber 319 yieldably urges the shift valve 310 to its right hand or third gear ratio position shown in Figure 7. Port 321 communicates with passage 371, and under certain conditions of operation admits line pressure from passage 371 to chamber 319. Port 322 is the pressure feed port to the third to fourth shift valve 310, being constantly subjected to pump pressure from passage 354. Port 323 is connected to port 231 of double transition valve 230 by way of passage 367. Ports 324 and 325 both exhaust to the transmission sump. Port 326 admits pressure from passage 361 to chamber 327 to the left of the governor plug piston 315 whenever pressure is admitted to passage 361 by port 168 of manual valve 160. Port 328 is open to governor pressure feed passage 381, the governor pressure acting in chamber 328a tending to upshift the third to fourth shift valve 310.

THROTTLE VALVE REGULATOR VALVE

At the top of Figure 7 there is shown a throttle valve regulator valve 330, the function of which is to oppose the effort of the governor to upshift the transmission and prevent upshifting when the torque demand is high. The valve 330 is formed of lands 331 and 332 joined by a reduced stem section. A spring 333 positioned between the end of land 331 and the end of the valve bore yieldably biases the valve to connect the throttle valve passages 336a, 254a, and 266a leading to the regulator plugs 277, 250 and 314 to exhaust. The valve bore is provided with ports 334, 335, 336 and 337. Port 334 connects chamber 338 adjacent spring 333 to throttle valve delivery passage 336a. Port 335 exhausts to the transmission sump. Port 336 connects to throttle valve pressure delivery passage 336a, and port 337 connects to throttle valve supply passage 365.

The pressure level of throttle valve pressure supplied to passage 365 and port 337 varies with the engine carburetor throttle opening, as expressed by the position of the vehicle accelerator pedal. With a closed throttle, throttle valve pressure will be zero. With a fully open throttle, throttle valve pressure will be line pressure. When the throttle valve pressure is less than 15 pounds per square inch, spring 333 biases the valve to the position shown wherein throttle valve supply passage 365 is blocked off from port 336, and passage 336a is exhausted through exhaust port 335. Thus, no throttle valve pressure will be applied to the throttle valve regulator plugs 277, 250 and 314 tending to downshift valves 240, 270, 310. When the throttle valve pressure in passage 365 exceeds 15 pounds per square inch, valve 330 is moved back against spring 333, thereby positioning land 332 to block off exhaust port 335 and to establish communication between ports 337 and 336 to admit throttle valve pressure from passage 365 to passages 336a, 254a and 266a. The throttle valve pressure will then act upon regulator plugs 277, the shift valve 270, regulator plug 250 and regulator plug 314. It will be noted that land 252 of regulator plug 250 is of greater diameter than that of land 251. Throttle valve pressure admitted through passage 254a will therefore be effective to move the regulator plug against the spring 253.

GOVERNOR PRESSURE

The governor device of Figure 12 is driven from gear 54 of carrier drum 53 (see Figure 2) at load shaft speed. The two governor valves 385 and 386 are alike, except for their masses and operate as described in the Letters Patent to Earl A. Thompson, U. S. 2,204,872, issued June 18, 1940, and shown in Figure 5 of that patent.

Cross-shaft gear 55 is driven by gear 54 of Figure 2, and is fixed to shaft 387 to which is also pinned the rotating governor body 388 carrying the valves 385 and 386. The body has pump feed passage 350 open to input ports 389 and 390, and two delivery passages 380 and 381, one from each of the valves, connected at ports 391 and 392, and the outer radial ports 393 and 394 vent the excess pressure to exhaust. With increase of speed of shaft 387 the valves 385 and 386 move radially outward under their individual centrifugal forces so as to supply separate fluid pressures to the governor plugs 246, 276, 315. Each governor valve 385 and 386 provides a separate speed rise effect as explained in the Thompson patent referred to. These are termed G–1 and G–2 pressures, respectively, and move or upshift the shifter valves 240, 270 and 310 against the forces opposing the governor upshift action. The governor pressure tends to upshift the second to third and third to fourth shift valves 270 and 310. Governor pressure is used to load the reverse blocker piston 446 of Figure 5, to apply pressure to regulator plug 276 of the second to third shift valve 270, to control the front band control valve 415 of Figure 5 and is directed to chamber 241a of the first to second shift valve piston 241. The reverse blocker piston 446 of Figure 5 is utilized to prevent the vehicle operator from accidentally shifting into reverse when the vehicle is operated at speeds above a predetermined minimum, for example, 5 miles per hour. The reverse shifter blocker is described in my co-pending application Serial No. 199,806, filed December 8, 1950.

As the vehicle speed increases, the governor output pressures rise, tending to upshift the shift valves 240, 270 and 310, which governor pressure in passage 380 acts on front band servo control valve 415, tending to force the valve 415 to a bottom position to admit line pressure from line pressure supply passage 360 to passage 366a. This governor pressure is particularly helpful when the transmission is being operated in intermediate range, in which third gear ratio is the top gear ratio obtainable. In third gear ratio the front band 11 and rear clutch 39—40 are applied, and the vehicle speed may be relatively high. With this condition of operation the torque transferred through the transmission is relatively large, and it is accordingly highly important to assure that there be no slippage of the front band 16 on the front drum 14 as would cause undue wear. By directing the governor pressure output to the valve 415 in the manner illustrated in Figure 5, valve 415 will, at some predetermined vehicle speed, be moved to admit maximum line pressure to passage 366a and chamber 120 of the front band servo, shown in Fig. 3, thus preventing any slippage thereof irrespective of vehicle speed.

TIMING VALVE

Figure 15:
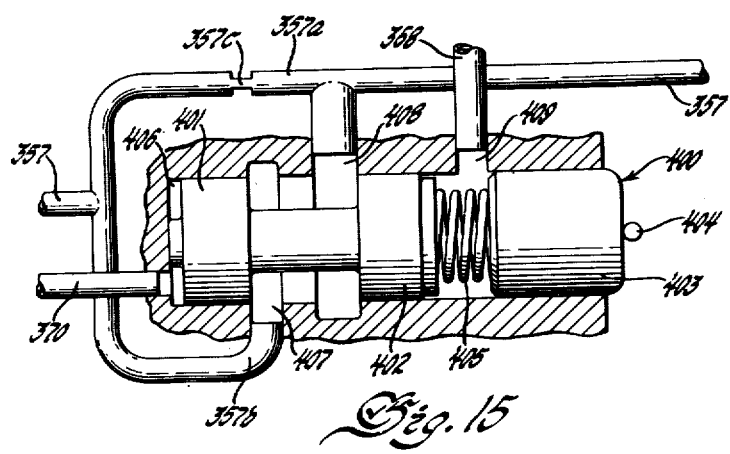
Figure 15 is an enlarged sectional view of the control system timing valve.

As shown in Fig. 5a timing valve 400 is placed in the control circuit in order to delay application of the rear unit band 45 until the front clutch 22—23 is applied. This valve is particularly useful in smoothing the shock which may occur in shifting from third to second gear. Valve 400 shown in detail in Figure 15 is made up of a pair of lands 401 and 402 joined by a reduced stem section. A plug 403 resting against pin 404 blocks off one end of the valve bore. A spring 405 yieldably urges lands 401 and 402 to the left.

The valve bore is provided with four ports 406, 407, 408 and 409. Port 406 connects to passage 370 leading to port 234 of double transition valve 230. Passage 370 also connects to port 285 of the second to third shift valve regulator plug 277. Port 407 connects the valve bore to rear clutch apply passage 357. Port 408 connects the valve bore to rear clutch apply passage 357, and port 409 connects the valve bore intermediate the end of land 402 and plug 403 to rear clutch apply-front band release passage 368. The operation of the timing valve will hereafter be more fully explained under the discussion of forced downshift operation.

FRONT BAND SERVO CONTROL VALVE

A front band servo control valve 415 is shown in detail in Figure 14. The valve 415 is used to alternately direct compensator pressure or full line pressure to passage 366a. The valve body is made up of lands 416, 417, 418 and 419 joined by reduced stem sections. Land 419 and the stem section between lands 417 and 418 are provided with drilled transverse passages 420 and 421, each communicating with an axial passage 422. Port 423 of the valve bore connects to governor pressure feed passage 380 and admits governor pressure to chamber 424 above the land 416. Port 425 connects to compensator pressure delivery passage 366 and admits compensator pressure to the valve bore intermediate lands 418 and 419. Port 426 and port 427 permit line pressure from front band apply pasage 360 to pass around an annular recess 428 in land 419 to the chamber 118 of the front band servo shown in Fig. 3. Pressure from passage 360 will also leak down to chamber 429 beneath land 419, tending to force the valve stem upwardly in the valve bore.

At low vehicle speeds, governor pressure in passage 380 and chamber 424 will be low so that the line pressure in passage 360 and chamber 429 will force the valve 415 upwardly in the bore so that land 418 will be moved upwardly to establish communication between compensator pressure delivery passage 366 and passage 366a. Thus, at low vehicle speeds, line pressure in chamber 118 and compensator pressure in chamber 120 act together to apply the front band. This arrangement prevents shock in the application of the band at low vehicle speeds. The compensator pressure increases with engine torque to prevent band slippage. It has been found, however, that when the vehicle accelerator pedal is retraded the compensator pressure may drop off to zero. At high vehicle speeds, as when operating in third gear in intermediate range setting of the manual valve 160, band slippage may result due to lack of sufficient compensator pressure. At relatively high vehicle speeds, for example 40 miles per hour, governor pressure is effective to force the control valve 415 to its bottom position wherein land 418 blocks off compensator pressure port 425 from port 430 and drilled passages 420 and 421 are aligned with passages 360 and 366a respectively. With the valve thus positioned, line pressure from passage 360 is admitted by way of passages 420, 422 and 421 to passage 366a, this pressure acting in chamber 120 together with line pressure in passage 360 to prevent band slippage.

CONTROL SYSTEM EXHAUST VALVE

Figure 16:
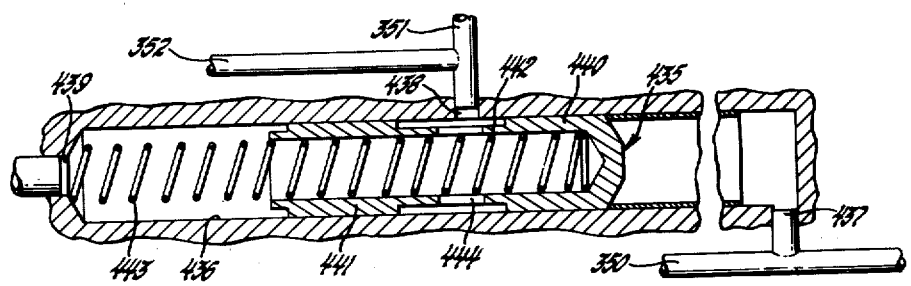
Figure 16 is an enlarged sectional view of the exhaust valve for exhausting the main line pressure supply passage to the manual drive range selector valve.

The main pressure feed line 351 is exhausted to the transmission sump by means of an exhaust valve 435, the details of which are shown in Figure 16. The valve 435 is positioned for sliding movement in a valve bore 436 having ports 437, 438 and 439. Port 437 admits line pressure from pump pressure feed line 350 to the valve bore. Port 438 admits line pressure from the valve bore to line pressure supply passage 351. Port 439 exhausts to the transmission sump. The valve 435 is made up of lands 440 and 441 joined by reduced stem section 442. The lands and stem section are hollow, there being a spring 443 disposed within the hollow portion of the valve. A radial bore 444 is drilled through hollow stem section 442.

When the vehicle engine is started, pump P driven by the engine supplies pressure to passage 350, this pressure acting through port 437 upon the end of land 440. At normal operating pressures, valve 435 is forced back against spring 443 to establish communication between passage 350 and 351. When the vehicle is stopped, pressure in passage 350 exhausts back to the sump through pump P. In transmission control systems of the present type wherein valve 435 was not supplied, all of the line pressure was required to exhaust through the pump P before the parking brake piston 445 of Figure 5 could be released. Due to the relatively small diameter of the system passages in relation to the total quantity of oil contained therein, and due to the fact that all of the line pressure was exhausted through pump P a considerable time lapse was required before the parking brake blocker piston 445 could be moved to permit the vehicle parking brake to be applied. With valve 435 included in the system, only passage 350 is exhausted through pump P. As the pressure in passage 350 drops off, spring 443 moves valve 435 to a position wherein land 440 blocks off passage 350 from passage 351, the passage 351 being exhausted to sump by way of port 444 in stem 442, through the hollow land 441 and by way of exhaust port 439. By this arrangement, parking brake blocker piston 445 is more quickly exhausted to permit the vehicle operator to apply the parking brake (not shown).

CONTROL SYSTEM

An engine driven pump P supplies working fluid to the fluid coupling W through passage 345 and supplies line pressure for the control system to line pressure supply passage 350 by way of passage 346 and check valve 347. A vehicle tail shaft driven pump Q supplies pressure to line pressure supply passage 350 by way of passage 348 and check valve 347. The check valve 347 serves to prevent communication from front pump P to pump Q when the pump Q is stopped. Passage 350 supplies pressure to valve 435, to the governor 388 and to parking brake blocking piston 445. As long as the engine is in operation, parking brake blocker piston 445 serves to prevent the vehicle operator from placing the manual control lever 463 of Figure 13 in "park" position. Details of the parking brake blocker mechanism are shown in my co-pending application, Serial No. 199,806, filed December 8, 1950 now Patent No. 2,763,162. Line pressure in passage 350 is conducted through valve 435 to passage 351 leading to line pressure supply port 165 of manual valve 160, through passage 352 to supply port 219 of compensator valve 210, through passage 353 to port 221 of compensator valve regulator plug 213, through passage 354 to the third to fourth shift valve 310 pressure supply port 322, through passage 355 to the first to second shift valve 240 pressure supply port 259, and through passage 356 to supply port 292 of regulator plug 277. Rear clutch apply passage 357 controlled by port 162 of the manual valve 160 connects to the rear clutch apply chamber 42, to ports 407 and 408 of timing valve 400, and to port 297 of the second to third shift valve 270. Passage 358 of port 163 of manual valve 160 leads to port 235 of double transition valve 230, to rear band release passage 359 and to port 262 of the first to second shift valve 240. Passage 360 of port 167 leads to front band servo control valve 415 and through the valve to chamber 118. The passage 360 also extends to pressure supply port 296 of the second to third shift valve 270. Port 166 of manual valve 160 admits pressure to throttle valve supply port 198 and to throttle valve port 201. Port 168 connects to passage 361, this passage terminating at port 326 of the third to fourth shift valve governor plug 315. Passage 362 connects port 169 of manual valve 160 to port 301 of governor plug 275 associated with the second to third shift valve 270. When pressure is supplied to passage 362, this pressure is admitted to chamber 265 of regulator plug 246 by way of port 302, passage 363 and port 264. Port 170 of manual valve 160 connects to reverse cone clutch apply passage 364, this passage also extending to port 220 of compensator valve 210 and to plug 451 of pump P. Throttle valve pressure delivery passage 365 delivers throttle valve pressure to port 216 of compensator valve 210, and to port 337 of the throttle valve regulator valve 330. When sufficient throttle valve pressure is present in passage 365, for example 15 pounds per square inch, throttle valve pressure is delivered through port 336 of valve 330 to port 287 of regulator plug 277, hence through port 291 to port 254 of throttle valve regulator plug 250 and by way of ports 266 and 329 to the top of regulator plug 314.

Port 218 of compensator valve 210 delivers compensator pressure through passage 366 to the bore of control valve 415 and to port 149 of the rear band apply servo 129. Compensator pressure is also directed to chamber 225 of double transition valve 230 by way of port 222. Passage 367 connects port 231 of double transition valve 230 to port 323 of the third to fourth shift valve 310. Port 232 of double transition valve 230 connects to front band release-front clutch apply passage 368, this passage terminating at port 409 of timing valve 400. Passage 369 connects port 233 of double transition valve 230 to port 260 of the first to second shift valve 240. Passage 370 connects port 234 of double transition valve 230 to port 406 of timing valve 400, and in addition, passage 370 connects to port 285 of regulator plug 277 associated with the second to third shift valve 270.

A passage 371 from port 202 of throttle valve 180 leads to port 283 of regulator plug 277, to port 321 of throttle valve plug 314, and to port 263 of regulator plug 245.

Governor pressure in passage 380 is delivered to port 304 of the second to third shift valve governor plug 276, to reverse blocker piston 446, to the top of valve 415, and to piston 241 of the first to second shift valve 240. Governor pressure in passage 381 is delivered to port 328 of the third to fourth shift valve governor plug 315 and to port 303 between the second to third shift valve governor plugs 275 and 276. Governor pressure acting upon reverse blocker piston 446 prevents the vehicle operator from shifting the manual control valve 160 to reverse position so long as the vehicle is traveling forward at speeds in excess of a predetermined speed, for example 5 miles per hour. The reverse blocking arrangement is disclosed in my co-pending application, Serial No. 199,806, filed December 8, 1950.

*Condition of operation*

NEUTRAL

With the manual valve 160 positioned for neutral, as shown in Figures 5 and 6, the control system functions as follows: Pump line pressure from pasage 351 is directed through the manual valve 160 through ports 165 and 163 to passage 358, this pressure acting through passage 359 and branch passages 359a and 359b leading to pistons 134 and 140 of the rear band servo 129, such pressure being effective to overcome the effect of servo apply springs 141 and 146 to release the rear band 45. Front band apply passage 360 is exhausted to the pump sump through manual valve exhaust port 171. Front clutch apply passage 368 is exhausted to sump by way of the double transition valve 230, which valve establishes communication between passages 368 and 369, the latter passage leading to exhaust port 260a (see Fig. 7) of the first to second shift valve 240. Rear clutch apply passage 357 is exhausted through exhaust port 161 of manual valve 160. Thus, with all of the transmission bands and clutches released, no power can be passed from the engine shaft to the vehicle tail shaft and the transmission is in neutral.

DRIVE RANGE

With manual valve 160 positioned for drive range of transmission operation as shown in Figure 8, four forward speeds may be obtained, depending upon the positioning of the various shift valves 240, 270 and 310. With the transmission in neutral, no governor pressure is available to tend to upshift the shift valves 240, 270 and 310. The valve springs, therefore, are initially effective to position the respective shift valves in their right hand position illustrated in Figure 7. When the manual valve 160 is moved from neutral to drive range, line pressure from passage 351 is admitted to passage 360 leading to chamber 118 of the front band 16 apply servo to apply the front band. The front band release-front clutch apply passage 368 is placed in communication with exhaust port 260a of the first to second shift valve 240 by means of double transition valve 230 which is in its "down" or right-hand position as viewed in Figure 6. Passage 369 leading to the first to second shift valve 240 exhaust port 260a is connected to passage 368 by means of ports 232 and 233 of the double transition valve 230. Rear clutch apply and rear band release passages 357 and 359 are exhausted through exhaust port 298 of the second to third shift valve 270. Pressure in rear band release passage 359 reaches exhaust port 298 of the second to third shift valve 270 by way of passage 358, ports 163 and 162 of manual valve 160, and passage 357. With the rear band release pressure of passage 359 exhausted to the transmission sump, rear band apply springs 141 and 143 are effective to apply the rear unit band 45. With the front and rear bands 16 and 45 applied, the transmission is in first or low gear.

As the vehicle speeds up the pressure level of the fluid pressure delivered by the tail shaft driven governor rises, the governor pressure being delivered by way of passage 380 to chamber 241a of the first to second shift valve 240, tending to upshift the valve 240 against the action of springs 244 and 253. Upon movement of shift valve 240 to its left hand position, pressure passage 355 is placed in communication with passage 369 through ports 259 and 260, this passage in turn being placed in communication with front band release and front clutch apply passage 368 by means of ports 232 and 233 of double transition valve 230 which is in its down or bottom position. This pressure, acting in chambers 117 and 126a of the front band servo, is effective to overcome the effect of front band apply pressure in chamber 118 and releases the front band 16.

The front band 16 is therefore released and pressure in passage 368 also acts to apply the front clutch 22—23. Since the rear clutch apply passage 357 and rear band release passage 359 are both exhausted through exhaust port 298 of the second to third shift valve 270, the front clutch 22—23 and rear band 45 are applied, thereby placing the transmission in second gear.

Upon increase in vehicle speed in second gear, the governor pressures supplied to governor plugs 276 and 275 of the second to third shift valve 270 increase in value until they are effective to move the second to third shift valve 270 to the left against the action of spring 282. When this occurs, line pressure, supplied through manual valve 160 to passage 360, is admitted to passage 357 by means of ports 296 and 297 of the second to third shift valve 270, this pressure in turn being fed to rear clutch 39–40 to apply the clutch. Passage 357 is placed in communication with passage 358 by means of ports 162 and 163 of manual valve 160, the latter passage 358 being in communication with chamber 236 of the double transition valve 230 to move the valve to its left hand position wherein passage 367 communicates with passage 368. Passage 358 also directs line pressure to port 262 of the first to second shift valve 240 to maintain the valve in its left hand or second speed position. Rear band release passage 359 is supplied with line pressure from passage 358. Passage 359, in turn, communicates with chambers 139 and 134a of the rear band servo, line pressure thereby being directed to the rear servo 129 to release the same. Line pressure is supplied to front band apply passage 360 by means of the manual valve 160, while front band release-front clutch apply passage 368 is connected to passage 367 by ports 232 and 231 of the double transition valve 230, passage 367 leading the third to fourth shift valve 310 exhaust port 324. With the front band 16 and rear clutch 39—40 applied, the transmission is conditioned for third speed gear ratio.

Upon further increase in vehicle speed in third gear, governor pressure fed by passage 381 to chamber 328a of the third to fourth governor plug 315 is effective to move the third to fourth shift valve 310 against the action of spring 320 to its left hand position. Line pressure from passage 354 is thereupon admitted to passage 367, which passage is in turn placed in communication with front band release-front clutch apply passage 368 by means of ports 231 and 232 of double transition valve 230, the latter valve being in its left hand position as explained in connection with third speed operation. The line pressure directed by passage 368 to chambers 117 and 126a is effective to overcome the effect of line pressure and compensator pressure tending to apply the front band. This is so because the effective area of chambers 117 and 126a is greater than that of chambers 118 and 120. The rear clutch 39—40 and rear band 45 release passages are supplied pressure by the second to third shift valve 270 as explained in connection with third speed operation. With the front and rear clutches 22—23 and 39—40 engaged and the front and rear bands 16 and 45 released, the transmission is conditioned for fourth speed or direct drive gear ratio.

INTERMEDIATE RANGE

With the manual valve 160 positioned for intermediate range operation, three forward speeds may be obtained. Line pressure from passage 351 is admitted through the manual valve to front band apply passage 360 and to passage 361 leading to chamber 327 above the third to fourth regulator plug 315. This line pressure in chamber 327 is effective to maintain the third to fourth shift valve 310 in its right hand or third speed position at all vehicle speeds irrespective of the tendency of the governor pressure to upshift the valve. Thus the transmission can never obtain a higher gear ratio than third speed regardless of vehicle speed so long as the manual valve 160 is maintained in intermediate range. At low vehicle speeds both the first to second and second to third shift valves 240 and 270 are in their right hand positions as explained in conjunction with the description of drive range operation. Initially, line pressure is supplied to front band apply passage 360 directly from the manual valve 160. Front clutch apply passage and front band release passage 368 is exhausted through the first to second shift valve 240 exhaust port 260a, the path of exhaust fluid being by way of passage 368, ports 232 and 233 of double transition valve 230 and passage 369. The rear clutch apply passage 357 is exhausted through exhaust port 298 of the second to third shift valve 270. Rear band release passage 359 communicates by way of passage 358 through the ports 163 and 162 of the manual valve 160 with passage 357 thereby being exhausted through the second to third shift valve 270 exhaust port 298. With both bands 16 and 45 applied and both clutches 22—23 and 39—40 released, the transmission is in first or low speed ratio.

Upon increase in vehicle speed, governor pressure from line 380 and acting upon piston 241 moves the first to second shift valve 240 to its left hand position, the valve thereupon admitting line pressure from passage 355 to passage 369, hence through the double transition valve 230 to ports 233 and 232 to front clutch apply-front band release passage 368. Rear clutch apply passage 357 is still exhausted through second to third shift valve 270 exhaust port 298 as is the rear band release passage 359, in the same manner heretofore described. With the front clutch 22—23 and rear band 45 applied, the transmission is conditioned for second speed ratio operation.

With a further increase in vehicle speed in second gear ratio, governor pressures from lines 380 and 381 act upon governor plugs 276 and 275, respectively, to cause the second to third valve 270 to upshift. With upward movement of the second to third shift valve 270, line pressure from passage 360 is admitted by way of ports 296 and 297 to rear clutch apply passage 357 to apply the rear clutch 39—40, and through ports 162 and 163 of the manual valve 160 to passage 358, the passage 358 in turn admitting line pressure to rear band release passage 359 to release the rear band 45. This line pressure in passage 358 acting in chamber 236 of the double transition valve 230 moves the double transition valve 230 to its left hand position, thereby admitting pressure from the front clutch apply-front band release passage 368 to passage 367 which in turn communicates with exhaust port 324 of the third to fourth shift valve 310. Line pressure from passage 359 is fed to the rear servo 129 to release the rear band 45. Line pressure from passage 360 is effective to apply the front band 16. With the rear clutch 39—40 and front band 16 applied, the transmission is conditioned for third gear ratio operation.

It will be noted that when manual valve 160 is placed for intermediate range operation that line pressure from main line supply passage 351 is admitted to passage 361 by way of ports 165 and 168 of the manual valve. Passage 361 admits line pressure by way of port 326 to chamber 327 of the third to fourth shift valve 310 governor plug 315. When line pressure is admitted to chamber 327, this pressure plus the effect of spring 320 are effective to maintain the third to fourth shift valve 310 in its right hand or third speed position irrespective of the effect of governor pressure acting in chamber 328a on the opposite side of the regulator plug 315. Thus, with the manual valve 160 positioned for intermediate range of operation, third speed is the top speed ratio attainable.

LOW RANGE

With the manual valve 160 positioned for low range operation, two forward speeds may be obtained. Upon movement of the manual valve 160 to low range, fluid pressure from main line passage 351 is admitted to front band apply passage 360, to passage 361 and to passage 362. Line pressure in passage 361 is admitted to chamber 327 above the third to fourth valve 310 regulator plug 315, thereby preventing upshift of the third to fourth valve. Pressure in passage 362 is admitted to chamber 275a above the second to third valve 270 regulator plug 275, thereby preventing upshift of the second to third valve 270. Line pressure from chamber 275a of the second to third valve 270 is admitted, by means of passage 363, to chamber 265 beneath the first to second valve 240 regulator plug 246, such pressure acting upon the regulator plug 246 to cause the first to second shift valve 240 to initially be positioned in its left hand or second speed position. With the first to second shift valve 240 in its left hand position, pressure from main line 355 is admitted to passage 369, this pressure passing through the double transition valve 230 to front band release-front clutch 22—23 apply passage 368 to apply the front clutch and release the front band 16. The rear servo release passage 359 is exhausted through the second to third shift valve 270 exhaust port 297, as is the rear clutch 39—40. The path for exhaust of rear band release pressure in passage 359 is by way of passage 358, ports 163 and 162 of manual valve 160, passage 357 and exhaust port 298 of shift valve 270. With the front clutch 22—23 and rear band 45 applied, the transmission is conditioned for second speed operation. Thus, when the manual valve 160 is moved to "low" range, the transmission is initially conditioned for second speed operation. A downshift to first or low gear may be obtained by depressing the vehicle accelerator pedal to provide full engine throttle pressure to the first to second shift valve 240 regulator plug 251 as hereafter more fully explained in conjunction with the description entitled "Downshift."

REVERSE

With the manual valve 160 positioned for "reverse," pressure is admitted from passage main line 351 to front band apply passage 360 to apply the front band 16, to passage 361, passage 362 and reverse cone apply passage 364 to apply the reverse cone clutch 61—63. Passages 361 and 362 supply pressure to prevent upshift of the second to third and third to fourth shift valves 270 and 310 in the same manner as described in conjunction with the operation in "low range." Front clutch apply-front band release passage 368 is exhausted through passage 369 and the first to second shift valve 240 exhaust port 260a. Communication between passage 368 and passage 369 is established through ports 232 and 233 of double transition valve 230. Rear clutch apply passage 357 is exhausted through the second to third shift valve 270 exhaust port 298. Manual valve port 164 supplies line pressure to passage 358 leading to rear band release passage 359 to release the rear band 45. Main line pressure from manual valve through passage 364 is fed through restriction orifice 364a to chamber 64 of the reverse cone clutch 61—63, thereby applying the clutch. Passage 364 also extends to chamber 223 at one end of compensator valve 211 and to the pump pressure regulator valve regulator plug 451, thereby providing increased line pressure for "reverse" condition of operation. With the front band 16 and reverse cone clutch 61—63 applied, the transmission is conditioned for "reverse" operation. Line pressure in chamber 223 of compensator valve 210 (from conduit 364, see Figs. 5 and 6) cuts off compensator pressure when the manual valve 160 is placed in reverse.

EFFECT OF THROTTLE VALVE PRESSURE

When the accelerator pedal is partially depressed to actuate throttle valve 180, valve section 181 admits line pressure from passage 166a to throttle valve output passage 365. Throttle valve output pressure acting in passage 196 upon the upper side of land 190, and acting in chamber 200 upon plug 192 reacts upon section 182, moving that section toward section 181, and compressing spring 184. The amount of movement of section 182 depends upon the force exerted upon section 181, as expressed by the position of the vehicle accelerator pedal. Thus, the further the accelerator pedal is forced down to open the engine throttle, the greater is the effective force of spring 184 upon section 182. Section 182, being acted upon by pressure from passages 196 and 193 will move toward section 181 until plug extension 189 uncovers exhaust port 194 and permits escape of fluid to the sump. The further section 181 is moved into the valve bore, the greater is the output pressure of the throttle valve. This output pressure acting upon slidable plug 192 normally moves the plug inwardly toward section 182 to provide a yieldable stop for preventing further movement of the valve sections 181 and 182 toward the upper end of the valve bore. The ports and lands of the valve section 182 are so arranged that valve section 181 will not normally uncover port 201 to admit line pressure to port 202 of forced downshift passage 371 even with full throttle opening. However, by exerting additional force upon the accelerator pedal after full throttle opening has been achieved, the valve sections may be moved inwardly against plug 192 to permit admission of line pressure to the forced downshift passage 371.

Assuming the vehicle is operated with the accelerator pedal partly depressed or fully depressed, but not depressed for forced downshift, throttle valve pressure from passage 365 acts upon throttle valve control valve 330, the valve 330 being effective to block passage 336a whenever throttle valve pressure is less than a predetermined minimum pressure, for example 15 pounds per square inch. Passage 336 will initially be exhausted through exhaust port 335 of valve 330. At throttle valve pressures above 15 pounds per square inch, throttle valve pressure will compress spring 333, moving valve 330 to admit pressure to passage 336a, to passage 254a and to passage 266a. Throttle valve pressure from passage 336a acts upon regulator plug 250 of the first to second shift valve 240, forcing the regulator plug downwardly to admit throttle valve pressure to passage 256a and chamber 257. Thus, shifting of the first to second valve 240 depends upon governor pressure from passage 380 tending to upshift the valve and throttle valve pressure tending to cause downshift. As heretofore stated, both of these pressures are variables, the governor pressure being a function of car speed and throttle valve pressure varying with throttle opening.

Throttle valve pressure likewise is introduced to chamber 290 of the second to third shift valve 270, the spring 282 and throttle valve pressure tending to downshift said valve, while governor pressures acting upon governor plugs 276 and 275, tends to upshift the valve. Throttle valve pressure from passage 266a acts upon the end of regulator plug 314 forcing the plug 314 down to establish communication between chamber 329 and port 317, the throttle valve pressure being admitted to chamber 319 of shift valve 310 by way of passage 318.

Except in the case of forced downshift, throttle valve pressure acting upon plug 314 is effective to move the plug 314 down to admit pressure to chamber 319, through passage 318. Thus, throttle valve pressure assists spring 320 tending to downshift the third to fourth shift valve 310, while governor pressure acting upon governor plug 315 tends to upshift the valve 310.

With the above arrangement, and assuming the throttle is not depressed to provide for forced downshift, the spring valves and pressure areas of the various valves acted upon by throttle valve pressure and governor pressure are so proportional that a shift pattern approximately as follows is attained. Assuming the manual valve 160 is placed in drive range so that four forward speeds are possible and that the vehicle is being accelerated from a standing start, upshifts will occur in the following vehicle speed ranges, depending upon the degree of throttle opening.

First to second, zero throttle, 8 miles per hour.
First to second, full throttle, 18 miles per hour.
Second to third, zero throttle, 10 miles per hour.
Second to third, full throttle, 30 miles per hour.
Third to fourth, zero throttle, 16 miles per hour.
Third to fourth, full throttle, 61 miles per hour.

Assuming the vehicle speed is being retarded and the transmission is not operating in forced downshift, automatic downshift occurs as follows:

Four to three downshift, zero throttle, 11 miles per hour.
Four to three downshift, full throttle, 22 miles per hour.

At vehicle speeds 10 miles per hour or less, and with full throttle, both the third to second and second to first valves 270 and 240 will downshift, providing a downshift from third to first. At zero throttle and speeds less than 6 miles per hour, the third to second and second to first valves 270 and 240 will downshift to change from third to first gear. However, with partial throttle opening and vehicle speeds between 6 and 10 miles per hour, the third to second valve 270 will downshift but the second to first valve 240 will not. The transmission will, under this condition of operation, remain in second gear ratio. Below 6 miles per hour the transmission will be in first gear ratio.

FORCED DOWNSHIFT

In addition to the normal downshifts heretofore described, forced downshifts may be obtained by depressing the vehicle accelerator pedal past the full throttle to a forced downshift position. Such action moves both sections of the throttle valve 180 into the valve bore and manually forces plug 192 to the left, irrespective of the effect of throttle valve output pressure acting upon the plug. This action is obtained by conscious effort on the part of the driver, plug 192 acting as a yieldable stop.

Movement of the throttle valve section 181 further into the valve bore admits line pressure from passage 166a to downshift passage 371, this pressure being directed to port 283 of regulator plug 277 of the second to third shift valve 270, to chamber 319 associated with the third to fourth shift valve 310 and to plug 246 associated with the first to second shift valve 240.

Assuming the vehicle is being operated in drive range, forced downshift pressure acting in chamber 319 will provide forced downshift from fourth to third at vehicle speeds between 21 and 65 miles per hour. Forced downshift pressure acting upon regulator plug 277 of the second to third shift valve 270 will force valve 270 inwardly, will connect line 371 to line 370, and will provide third to second downshift at vehicle speeds between 17 and 21 miles per hour.

Forced downshift pressure in passage 371 is also directed to port 263 of the first to second shift valve regulator plug 246, this pressure in chamber 265a counteracting the effect of line pressure in chamber 265. Throttle valve pressure, which is now a maximum due to the fully open position of the engine throttle, will cause a second to first speed forced downshift at vehicle speeds below 8 miles per hour.

As heretofore stated, the admission of line pressure from the throttle valve 180 to passage 371 for forced downshift of the shift valves 240, 270 and 310 directs line pressure to port 283 of regulator plug 277, this pressure being effective to move plug 277 in its bore to admit line pressure from passage 371 to passage 370 by way of ports 283 and 285. Pressure in passage 370 is admitted to port 406 of timing valve 400, this pressure being effective to move valve 400 against spring 405 so that band 401 blocks off port 407 from port 408. It will be noted that rear clutch apply passage 357 is branched at 357a and 357b, the branch 357a communicating with port 408 of the timing valve and branch 357b communicating with port 407 of the timing valve 400. A restriction 357c is placed in branch 357a. In normal shifting operation, spring 405 is effective to position the valve 400 so that ports 407 and 408 are placed in communication. Front clutch apply-front band release passage 368 is connected to port 409 positioned between the end of land 402 and plug 403. With the transmission operating in third gear the front band 16 and rear clutch 39—40 are applied. In second gear the front clutch 22—23 and rear band 45 are applied. In accomplishing the shift from third to second speed on forced downshift it has been found to be advantageous to prevent full release of the rear clutch 39—40 and application of the rear band 45 until the front clutch 22—23 is first applied. The timing valve 400 accomplishes this result by controlling the rate of discharge of fluid pressure from rear clutch apply passage 357 and rear band release passage 359. The valve 400 provides for restricted exhaust of rear clutch apply passage 357 and rear band release passage 359 until such time that front clutch 22—23 is fully applied. After the front clutch 22—23 is applied, front clutch apply pressure in passage 368 is effective in chamber 409 of the timing valve 400 to counteract the effect of line pressure in passage 370 so that spring 405 is effective to move the valve 400 to establish unrestricted communication of exhaust fluid through branch 357b and ports 407 and 408 of said timing valve. Line pressure in passage 370 is admitted to port 234 of double transition valve 230 to move said double transition valve to connect passages 368 and 369 to admit line pressure from passage 369 to passage 368 to apply the front clutch 22—23 and release the front band 16. This accomplishes the shift from third to second gear. The interaction of timing valve 400 and double transition valve 230 and the action of the timing valve 400 whereby exhaust of pressure from the rear clutch apply passage 357 and rear band release passage 359 is restricted until such time as the front clutch 22—23 is fully engaged is of great advantage in the operation of the transmission. As the front clutch 22—23 is applied, pressure in passage 368 is directed to port 409 of the timing valve 400 to assist spring 405 to overcome the effect of line pressure acting upon the opposite end of said valve. When front clutch 22—23 is fully engaged, valve 400 permits unrestricted discharge of pressure from rear clutch apply passage 357 by way of branch 357b, ports 407 and 408 of valve 400 and exhaust port 298 of third to second shift valve 270.

Referring to Figure 13, there is shown a linkage system whereby the vehicle operator may set the manual valve 160 of Figure 5 for park, neutral, low range, intermediate range, drive range, and reverse operation together with the linkage for operating the throttle valve 180 in response to movement of the vehicle accelerator pedal.

When the accelerator pedal 410 is depressed, motion is transferred through linkage 411, 412 and 413 to rotate plate 414 about pivot pin 452, thereby moving stub shaft 453 and block 454, causing link 455 to move to the left, to thereby impart clockwise motion to shaft 457 through lever 456. Shaft 457 carries cam 475 (see Figure 6) for controlling throttle valve 180.

Shaft 462 is rotated by linkage 458, 459, 460 and 461 from the control handle 463 of Figure 13. Shaft 462 controls pin 177 of Figures 6 and 8 through 11 to move the manual valve 160.

This specification discloses many novel features in control systems for transmissions of the class decribed, among which are: A three-range transmission including low range having two forward speed ratios, an intermediate range having three forward speed ratios, and a drive or high range having four forward speed ratios. In low range the transmission normally starts in second gear, there being provision for automatic downshift to first gear for heavy pulling. Intermediate range provides normal first gear start with upshifts through second and third gear. Drive range provides for first gear start with automatic upshift through second and third to direct drive.

The timing valve 400 and its arrangement in the control system for controlling the double transition valve and exhaust of fluid pressure from the rear clutch and rear band apply servos until the front clutch is first fully applied is another important and novel feature. Control of the front band control valve 415 by means of governor pressure which increases with vehicle speed to admit full line pressure chamber 120 of the front band servo at a predetermined vehicle speed is likewise an important and novel feature. The addition of valve means 435 for providing a separate exhaust for the main pressure supply passage 151 when the vehicle engine is stopped and the vehicle is standing still is an additional novel feature of the control system. Another novel feature is the provision of the passage 371 controlled by the throttle valve 180 for obtaining forced downshift of the first to second shift valve 240 when throttle valve 180 is positioned to admit pressure to passage 371.

These and other novel improvements in the control system have been described in the above specification and are set forth in the accompanying claims.

I claim:

1. In a control system for a transmission having a planetary gearing unit and having fluid pressure responsive servo members for determining the drive condition of the transmission, a pump for supplying fluid pressure to said control system, a pump discharge passage for supply of fluid pressure to one portion of said control system, a branch passage communicating with said pump discharge passage for supplying fluid pressure to a second portion of said control system, said pump constituting the path for exhausting fluid from said first-mentioned portion of said control system when said pump is inoperative, a valve in said branch passage responsive to pressure supplied to said branch passage by said pump discharge passage, said valve being effective in one position to connect said branch passage to said pump discharge passage and effective in another position to block said branch passage from said pump discharge passage and to connect said branch passage to exhaust, and means yieldably biasing said valve to said last-mentioned position.

2. In a control system for a vehicle transmission having front and rear planetary gearing units, a selectively operable band and clutch for controlling the gear ratio of said front gearing unit and a selectively operable band and clutch for controlling the gear ratio of the rear gearing unit, fluid pressure responsive servo members for controlling each of said bands and clutches respectively, a fluid pressure source, a valve control system including a plurality of shift valves for selectively directing fluid pressure from said selected source to said servo units to select the gear ratio of said transmission, a governor responsive to vehicle speed for directing a variable pressure to said shift valves for upshifting said shift valves, a regulator plug associated with each of said shift valves, a driver operable pressure metering valve for delivering a variable pressure to said regulator plugs for downshifting said shift valves, and an additional valve intermediate said pressure metering valve and said regulator plugs responsive to pressure delivered by said pressure metering valve, said additional valve being effective in one position to connect said regulator plugs to exhaust and effective in a second position to connect said regulator plugs to pressure delivered by said pressure metering valve.

3. In a control system for a vehicle transmission having a plurality of planetary gearing units, brake and clutch means operatively associated with each of said units, fluid pressure responsive servo units for controlling said brakes and clutches respectively, a fluid pressure source, a valve control system including a plurality of shift valves for selectively directing fluid pressure from said source to said servo members to select the gear ratio of said transmission, a governor responsive to vehicle speed for directing variable pressure to said shift valves for upshifting said valves, a driver operable pressure metering valve for delivering a variable metered pressure, a regulator plug associated with each of said shift valves, a delivery passage for said driver operable pressure metering valve, an additional valve connected to said last-mentioned passage responsive to pressure delivered by said passage, a passage connecting said additional valve to said regulator plugs, said additional valve being effective in one position to connect all of said regulator plugs to exhaust and effective in a second position to connect said regulator plugs to the output of said driver operable pressure metering valve for downshifting said shift valves, and means yieldably biasing said additional valve to said first-mentioned position.

4. In a control system for a vehicle transmission having a planetary gearing unit and having fluid pressure responsive servo members for determining the drive condition of said transmission, a source of fluid pressure, a manual valve connected to said fluid pressure source, a line pressure delivery passage controlled by said manual valve for delivering line pressure to one of said servo members to actuate the same, a pressure metering valve for delivering a variable metered pressure, a second passage for delivering fluid pressure to said servo, a control valve in said second passage for controlling admission of fluid pressure to said second passage, and a passage connecting said pressure metering valve to said control valve, said control valve being effective in one position to connect said pressure metering valve delivery passage to said second passage and effective in another position to connect said line pressure delivery passage to said second passage.

5. In a control system for a vehicle transmission having a planetary gearing unit and having fluid pressure responsive servo members for determining the drive condition of the transmission, a source of fluid pressure, a manually operable valve connected to said pressure source, a line pressure delivery passage controlled by said manual valve for admitting line pressure to one of said servo members to actuate the same, a pressure metering valve for delivering a variable metered fluid pressure, a variable pressure delivery passage extending from said pressure metering valve, a second pressure delivery passage for delivering fluid pressure to said servo member, a control valve for alternately connecting said line pressure delivery passage and said variable pressure delivery passage to said second pressure delivery passage, and means responsive to vehicle speed for controlling the position of said control valve.

6. In a control system for a vehicle transmission having a planetary gearing unit and having fluid pressure responsive servo members for determining the drive condition of the transmission, a source of fluid pressure, a manually operable valve connected to said pressure source, a line pressure delivery passage controlled by said manual valve for admitting line pressure to one of said servo members to actuate the same, a pressure metering valve for delivering a variable metered fluid pressure, a variable pressure delivery passage extending from said pressure metering valve, a second pressure delivery passage for delivering fluid pressure to said servo member, a control valve for alternately connecting said line pressure delivery passage and said variable pressure delivery passage to said second pressure delivery passage, said control valve having a member responsive to pressure in said line pressure delivery passage for positioning said valve to connect said variable pressure delivery passage to said second pressure delivery passage, and means responsive to vehicle speed for positioning said control valve to connect said line pressure delivery passage to said second pressure delivery passage.

7. In a control system for a vehicle transmission having a plurality of planetary gearing units, a brake and a clutch operatively associated with each of said gearing units respectively, fluid pressure responsive servo units for controlling said brakes and clutches, respectively, a fluid pressure source, a drive range selector valve for selecting any one of a plurality of forward drive ranges operatively connected to said pressure source, means connecting said selector valve to one control chamber of one of said servos when said selector valve is positioned in any forward drive range position, a pressure metering valve for delivering a variable metered pressure to a second control chamber of said one servo, and valve means effective in one position to connect the pressure delivered by said selector valve to said second control chamber to assist the pressure delivered by said manual valve to said one control chamber to apply said servo, said valve means being effective in a second position to connect the pressure delivered by said pressure metering valve to said second control chamber.

8. In a control system for a vehicle transmission having a plurality of planetary gearing units, a brake and a clutch operatively associated with each of said gearing units respectively, fluid pressure responsive servo units for controlling said brakes and clutches respectively, a fluid pressure source, a drive range selector valve for selecting any one of a plurality of forward drive ranges operatively connected to said pressure source, means connecting said selector valve to one control chamber of one of said servos when said selector valve is positioned in any forward drive range position, a pressure metering valve for delivering a variable metered pressure to a second control chamber of said one servo, and valve means effective in one position to connect the pressure delivered by said selector valve to said second control chamber to assist the pressure delivered by said manual valve to said one control chamber to apply said servo, said valve means being effective in a second position to connect the pressure delivered by said pressure metering valve to said second control chamber, said control valve being biased by pressure delivered by said selector valve to said second position, and means responsive to vehicle speed for biasing said control valve to said first position.

9. In a control system for a vehicle transmission having a plurality of planetary gearing units, brake and clutch units operatively associated with each of said gearing units respectively, fluid pressure responsive servo units for controlling said brakes and clutches respectively, a fluid pressure source, a drive range selector valve for selecting any one of three forward drive ranges operatively connected to said pressure source, one of said drive ranges providing two forward speed ratios, a second drive range providing three forward speed ratios, and a third drive range providing four forward speed ratios, means connecting said selector valve to one control chamber of one of said servos when said selector valve is positioned to select any drive range condition of transmission operation, a pressure metering valve for delivering a variable metered pressure, a governor for delivering a variable metered pressure increasing with increase of vehicle speed, and a control valve effective in one position to connect the output of said pressure metering valve to a second control chamber of said one servo unit and effective in a second position to connect the output of said drive range selector valve to said second control chamber of said one servo unit, said valve being yieldably biased to said one position by pressure delivered by said selector valve and biased toward said second position by pressure output of said governor valve.

10. In a control system for a vehicle transmission having a plurality of planetary gearing units, brake and clutch means operatively associated with each of said units, fluid pressure responsive servo units for controlling said brakes and clutches respectively, a fluid pressure source, a manually operable drive range selector valve for selecting any one of three forward drive ranges of transmission operation connected to said pressure source, a governor for delivering a variable pressure increasing with increases of vehicle speed connected to said pressure source, a line pressure delivery passage controlled by said manual valve for admitting line pressure to one of said fluid pressure responsive servo members to actuate the same, a pressure metering valve for delivering a variable metered pressure, a delivery passage for said variable pressure metering valve, a second passage for delivering fluid pressure to said one servo unit to assist the pressure delivered by said manual valve to actuate said one servo unit, a control valve for said one servo effective in one position to connect said line pressure delivery passage to said second passage connecting to said servo unit and effective in another position to connect said variable pressure delivery passage to said second passage connecting to said servo unit, said control valve being yieldably biased by pressure in said line pressure delivery passage to said one position and biased by governor delivered pressure to said other position at a predetermined vehicle speed.

11. In a control system for a vehicle transmission having a plurality of planetary gearing units, a brake and a clutch operatively associated with each of said units, fluid pressure responsive servo units for controlling said brakes and clutches respectively, a pump for supplying line pressure, a manually operable drive range selector valve for selecting any of three forward drive ranges of vehicle operation, one of said drive ranges including two forward gear ratios, the second of said drive ranges including three forward gear ratios and the third drive range including four forward gear ratios, a governor for delivering a variable pressure with increases with increase of vehicle speed, a passage connecting said pump to said governor, a passage connecting said governor pressure supply passage to said manual valve, a valve in said last-mentioned passage responsive to pressure supplied by said first-mentioned passage for admitting pressure from said first to said second-mentioned passage, a spring yieldably biasing said valve to block off communication between said passages and to connect said second passage to exhaust, a line pressure delivery passage controlled by said manual valve for admitting line pressure to one of said servo members to actuate the same, a pressure metering valve for delivering a variable metered pressure, a delivery passage for said variable pressure metering valve, a second passage for delivering fluid pressure to said one servo unit to assist the pressure delivered by said manual valve to actuate said one servo unit, a control valve for said second passage effective to alternately connect said second passage to said line pressure delivery passage and to said variable metered pressure delivery passage, said control valve being responsive to pressure delivered by said manual valve to connect said variable metered pressure delivery passage to said second passage connected to said one servo unit, and a governor pressure delivery passage connecting said governor to said control valve, said governor delivery passage being effective at a predetermined vehicle speed to position said control valve to connect said manual valve line pressure delivery passage to said second passage for delivering pressure fluid to said one servo unit.

12. In a control system for a vehicle transmission having front and rear planetary gearing unit, a front band and a front clutch for controlling the gear ratio of said front gearing unit, a rear band and a rear clutch for controlling the gear ratio of the rear planetary gearing unit, fluid pressure responsive servo members for controlling said bands and clutches respectively, a fluid pressure source, a valve control system including a plurality of valves for controlling the actuation of said servo units, said valve control system being effective in one condition of operation to actuate one of said front unit servo members and one of said rear unit servo members to select a given transmission gear ratio, said control system being effective in another condition of operation to actuate the other front unit servo member and the other rear unit servo member to select a different transmission gear ratio, a manually operable valve for causing said control system to change the transmission gear ratio from said first-mentioned gear ratio to said second-mentioned gear ratio, and a timing valve controlled by said manual valve for limiting the rate of release of one of said gear unit servo members until one of the other gear unit servo members is fully applied, said timing valve being thereafter controlled by fluid pressure supplied to said other gear unit servo member to fully release said one gear unit servo member.

13. In a control system for a transmission having a planetary gearing unit and having a plurality of fluid pressure responsive servo members for determining the drive condition of the transmission, a fluid pressure source, means for selectively directing fluid pressure from said source to a pair of said servo members for selecting a drive condition of said transmission, a manually operable valve for controlling said selecting means to direct pressure to a second pair of said servo members to select a different transmission drive condition, and a timing valve controlled by said manually operable valve for delaying the release of one of said first pair of servo members until one of said second pair of servo members is first fully actuated, said timing valve being thereafter effective to permit unrestricted release of said one of said first pair of servo members.

14. In a control system for a vehicle transmission having front and rear planetary gearing units, a front brake and a front clutch for controlling the gear ratio of said front gearing unit, a rear brake and a rear clutch for controlling the gear ratio of the rear gearing unit, a fluid pressure responsive servo unit for applying said front gearing unit brake, said servo unit being applied and released by fluid pressure, a servo unit for applying said front unit clutch, a servo unit for applying said rear unit clutch, a servo unit for applying said rear unit brake, said last-mentioned servo unit being applied by springs and released by fluid pressure, a fluid pressure source, a valve system including a plurality of valves adapted to direct fluid pressure from said source to said front brake servo to apply said front brake and to said rear clutch and rear band servos to apply said rear clutch and release the rear brake for selecting a given transmission gear ratio, a vehicle accelerator pedal controlled valve operable to overcontrol said valve system to cause said system to direct fluid pressure from said source to said front clutch and front brake servos to release said front brake and apply said front clutch and to exhaust fluid pressure from said rear clutch and rear brake servos, and a timing valve controlled by said accelerator pedal controlled valve for restricting the rate of exhaust of pressure from said rear clutch and rear brake servos for preventing release of said rear clutch and application of said rear brake until said front clutch has first been applied.

15. In a control system for a vehicle transmission having front and rear planetary gearing units, a front brake and a front clutch for controlling the gear ratio of said front gearing unit, a rear brake and a rear clutch for controlling the gear ratio of the rear gearing unit, a fluid pressure responsive servo unit for applying said front gearing unit brake, said servo unit being applied and released by fluid pressure, a servo unit for applying said front unit clutch, a servo unit for applying said rear unit clutch, a servo unit for applying said rear unit brake, said last-mentioned servo unit being applied by springs and released by fluid pressure, a fluid pressure source, a valve system including a plurality of valves adapted to direct fluid pressure from said source to said front brake servo to apply said front brake and to said rear clutch and rear band servos to apply said rear clutch and release the rear brake for selecting a given transmission gear ratio, a vehicle accelerator pedal controlled valve operable to overcontrol said valve system to cause said system to direct fluid pressure from said source to said front clutch and front brake servos to release said front brake and apply said front clutch and to exhaust fluid pressure from said rear clutch and rear brake servos, and a timing valve controlled by said accelerator pedal controlled valve for restricting the rate of exhaust of pressure from said rear clutch and rear brake servos for preventing release of said rear clutch and application of said rear brake until said front clutch has first been applied, said timing valve being thereafter controlled by fluid pressure supplied to said front clutch servo to provide unrestricted exhaust of fluid pressure from said rear clutch and rear band servos.

16. In a control system for a planetary transmission having front and rear planetary gearing units, a front band and a front clutch for controlling the gear ratio of said front gearing unit, a rear band and a rear clutch for controlling the gear ratio of said rear planetary gearing unit, fluid pressure responsive servo members for controlling said bands and clutches respectively, a fluid pressure source, a valve system including a plurality of valves for directing fluid pressure from said source to said front band servo and said rear clutch servo for selecting a gear ratio in said transmission, a manually operable valve for controlling said valve system to cause said valve system to direct fluid pressure from said source to said front clutch servo and said front band servo to apply the front clutch and release the front band and to exhaust said rear clutch and rear band servos to select a different gear ratio in said transmission, and a timing valve controlled by said manual valve for restricting release of said pressure from rear clutch servo until pressure is supplied to said front clutch servo.

17. In a control system for a planetary transmission having front and rear planetary gearing units, a front band and a front clutch for controlling the gear ratio of said front gearing unit, a rear band and a rear clutch for controlling the gear ratio of said rear planetary gearing unit, fluid pressure responsive servo members for controlling said bands and clutches respectively, a fluid pressure source, a valve system including a plurality of valves for directing fluid pressure from said source to said front band servo and said rear clutch servo for selecting a gear ratio in said transmission, a manually operable valve for controlling said valve system to cause said valve system to direct fluid pressure from said source to said front clutch servo and said front band servo to apply the front clutch and release the front band and to exhaust said rear clutch and rear band servos to select a different gear ratio in said transmission, and a timing valve controlled by said manual valve for restricting release of said pressure from rear clutch servo until pressure is supplied to said front clutch servo, said timing valve being thereafter controlled by fluid pressure supplied to said front clutch servo to more rapidly release the pressure from said rear clutch servo.

18. In a control system for a vehicle transmission having planetary gearing adapted to provide a plurality of drive ratios, a pump for supplying fluid pressure, a pump delivery passage for supplying fluid pressure to one portion of said control system, a branch passage for supplying fluid pressure to a second portion of said control system, said pump constituting the path for exhausting fluid from said first-mentioned portion of said control system when said pump is inoperative, a valve responsive to pressure fluid supplied to said pump delivery passage, said valve being effective in one position to connect said branch passage to said pump delivery passage and effective in another position to block said branch passage from said pump delivery passage and to connect said branch passage to exhaust, and means yieldably biasing said valve to said last-mentioned position.

19. In a control system for a vehicle transmission having planetary gearing adapted to provide a plurality of drive ratios, a pump for supplying fluid pressure to one portion of said control system including a governor and a parking brake blocking mechanism, a branch passage for supplying fluid pressure to a second portion of said control system, said pump constituting the path of exhaust of fluid from said first-mentioned portion of said control system when said pump is inoperative, a valve responsive to pressure delivered to said pump delivery passage for admitting fluid pressure to said branch passage, said valve being effective in a second position to block off said branch passage from said pump pressure delivery passage and to connect said branch passage to exhaust, and means yieldably biasing said valve to said second position.

20. In a control system for a vehicle transmission having a plurality of planetary gearing units, fluid pressure responsive servo units operatively associated with each of said gearing units, respectively, a fluid pressure source, a manually operated valve connected to said pressure source, a line pressure delivery passage controlled by said manual valve for admitting line pressure to one of said servo units to actuate the same, a pressure metering valve for delivering a variable metered pressure, passage means for connecting said pressure metering valve to said fluid pressure source, a delivery passage extending from said pressure metering valve, a second delivery passage for delivering pressure fluid to said servo, a control valve for alternately connecting said line pressure delivery passage and said variable pressure delivery passage to said second pressure delivery passage, said control valve responsive to pressure in said line pressure delivery passage for connecting said variable pressure delivery passage to said second delivery passage, and means responsive to vehicle speed for positioning said control valve to connect said line pressure delivery passage to said second delivery passage.

21. In a control system for a vehicle transmission having a plurality of planetary gearing units, fluid pressure responsive servo members operatively associated with each of said gearing units, respectively, a fluid pressure source, a drive range selector valve adapted to deliver fluid pressure from said source to a control chamber of one of said servo members, an accelerator pedal controlled pressure metering valve adapted to deliver a variable pressure to a second control chamber of said one servo member, passage means for connecting said pressure metering valve to said fluid pressure source, and additional valve means effective in one position to connect said second control chamber to said fluid pressure source, said valve means being effective in a second position to connect said second control chamber to pressure delivered by said pressure metering valve.

22. In a control system for a vehicle transmission having a plurality of planetary gearing units, fluid pressure operated servo units operatively associated with each of said gearing units, respectively, a fluid pressure source, a manually operated drive range selector valve for selecting any one of a plurality of drive ranges of transmission operation connected to said pressure source, a speed responsive governor connected to said pressure source, a line pressure delivery passage controlled by said manual valve connecting said manual valve to one of said servo units, an accelerator pedal controlled pressure metering valve for delivering a variable pressure, passage means for connecting said pressure metering valve to said fluid pressure source, a delivery passage for said pressure metering valve, a second passage for delivering fluid pressure to said one servo unit, a control valve effective in one position to connect said line pressure delivery passage to said second passage connecting to said servo unit and effective in another position to connect said variable pressure delivery passage to said second passage connecting to said servo unit, said control valve being yieldably urged by pressure in said line pressure delivery passage to said one position and movably by governor delivered pressure against the effect of line pressure to said other position at a predetermined vehicle speed.

23. In a control system for a vehicle transmission having front and rear planetary gearing units, a band and a clutch for controlling the drive ratio of said front gearing unit, a band and a clutch for controlling the drive ratio of said rear gearing unit, fluid pressure responsive servo members for controlling the bands and clutches, respectively, a fluid pressure source, a valve control system including a plurality of valves for controlling the actuation of said servo units, said valve control system being effective in one condition of operation to actuate one of said front unit servo members and one of said rear unit servo members to select a given transmission drive ratio, said control system being effective in another condition of operation to actuate the other front unit servo member and the other rear unit servo member to select a different transmission drive ratio, a manually operable valve for causing said control system to change the drive ratio from said first-mentioned drive ratio to said second-mentioned drive ratio, and a timing valve controlled by said manual valve for initially restricting the rate of exhaust of pressure from one of said servo members for preventing application of said one servo member until a second servo member is applied, said timing valve being thereafter controlled by pressure supplied to said second servo member to permit unrestricted exhaust of fluid pressure from said one servo member.

24. In a control system for a vehicle transmission having a plurality of fluid pressure responsive servo members for establishing transmission drive ratio, a fluid pressure source, control valving effective in one position to direct fluid pressure to selected servo members to establish a given drive ratio, an accelerator pedal controlled valve operable to overcontrol said control valving to select a different transmission drive ratio, and a timing valve controlled by said accelerator pedal controlled valve for initially permitting restricted release of fluid pressure from one of said servo members until a second of said servo members is fully actuated, said timing valve being thereafter movable in response to fluid pressure directed to said second servo member to permit unrestricted discharge of pressure fluid from said one servo member.

25. In a control system for a transmission having fluid pressure responsive servo members operable to establish different transmission drive ratios, pump means for supplying fluid pressure to actuate said servo members, means for controlling the admission of fluid pressure from said pump means to said servo members to control the transmission drive ratio including fluid pressure controlled shift valve means and a drive range selector valve, governor means adapted to deliver a variable pressure to said shift valve means to control the position of said shift valve means, a pump discharge passage connected to said governor for supplying fluid pressure to said governor, a branch passage communicating with said pump discharge passage for supplying fluid pressure to the remainder of said control system, said pump constituting the path for exhaust of fluid from said pump discharge passage when said pump is inoperative, a valve in said branch passage responsive to the pressure supplied to said branch passage by said pump discharge passage, said valve being effective in one position to connect said branch passage to said pump discharge passage and effective in another position to block said branch passage from said pump discharge passage and to connect said branch passage to exhaust, and means yieldably biasing said valve to said last-mentioned position.

26. In a control system for a transmission having fluid pressure responsive servo members operable to establish different transmission drive ratios, pump means for supplying fluid pressure to actuate said servo members, means for controlling the admission of fluid pressure from said pump means to said servo members for controlling the transmission drive ratio including a fluid pressure controlled shift valve and a drive range selector valve, a governor adapted to deliver a variable pressure to said shift valve to control the position of said shift valve, a pump discharge passage connected to said governor for connecting said governor to said pump means, a branch passage communicating with said pump discharge passage for supplying fluid pressure to said shift valve and said drive range selector valve, said pump constituting the path for exhaust of fluid from said pump discharge passage when said pump is inoperative, valve means responsive to fluid pressure supplied to said pump discharge passage, said valve being effective in one position to connect said branch passage to said pump discharge passage and effective in another position to block off said branch passage from said pump discharge passage and to connect said branch passage to exhaust, and means yieldably biasing said valve to said last-mentioned position.

27. In a control system for a vehicle transmission having gearing adapted to provide a plurality of drive ratios, a pump for supplying fluid pressure to one portion of said control system including a parking brake blocking mechanism, a branch passage for supplying fluid pressure to a second portion of said control system, said pump constituting the path of exhaust of fluid from said first-mentioned portion of said control system when said pump is inoperative, a valve responsive to pressure delivered to said pump delivered passage for admitting fluid pressure to said branch passage, said valve being effective in a second position to block off said branch passage from said pump delivery passage and to connect said branch passage to exhaust, and means yieldably biasing said valve to said second position.

28. In a control system for a vehicle transmission having a plurality of fluid pressure responsive servo members for establishing transmission drive ratio, a fluid pressure source, shift valving effective in one position to direct fluid pressure to selected servo members to establish a given drive ratio, accelerator pedal operated means movable through a first range of movement for overcontrolling said shift valving to select a different drive ratio, a timing valve for initially permitting restricted release of fluid pressure from one of said servo members until a second of said servo members is fully actuated, a control chamber associated with said timing valve adapted to be hydraulically connected to said fluid pressure source, said accelerator pedal actuated means being effective throughout said first range of movement to connect said control chamber to exhaust, said accelerator pedal actuated means being effective throughout a second range of movement to connect said control chamber to said fluid pressure source, a second control chamber associated with said timing valve and hydraulically connected to said second servo member, said timing valve being biased by fluid pressure directed to said second servo member to permit unrestricted discharge of fluid pressure from said one servo member.

29. In a control system for a transmission having planetary gearing and having a plurality of fluid pressure responsive servo members operable to establish a plurality of drive ratios, a fluid pressure source, means for controlling the admission of fluid pressure to said servos including a plurality of shift valves and a drive range selector valve, means for connecting said drive range selector valve to said fluid pressure source, speed responsive governor means connected to said fluid pressure source, control chambers associated with said shift valves hydraulically connected to said governor means, additional control chambers associated with said shift valves and controlled by said drive range selector valve, said drive range selector valve being effective in one position to connect all of said additional control chambers to exhaust, said drive range selector valve being movable to a second position to connect one of said additional control chambers to said fluid pressure source and the remainder of said additional control chambers to said fluid pressure source, and driver operable control means for selectively moving said drive range selector valve to any one of said three positions.

30. In a control system for a vehicle transmission having planetary gearing and having a plurality of fluid pressure responsive servo members operable to establish first, second, third, and fourth drive ratios, a fluid pressure source, means for controlling the admission of fluid pressure to said servo members including a first to second shift valve, a second to third shift valve, a third to fourth shift valve, and a drive range selector valve, means connecting said drive range selector valve to said fluid pressure source, control chambers associated with each of said shift valves, governor means connected to said fluid pressure source adapted to deliver a variable pressure which increases with increase in speed of rotation of said governor to said control chambers, additional control chambers associated with said shift valves controlled by said drive range selector valve, said drive range selector valve being effective in one position to connect all of said additional control chambers to exhaust, said drive range selector valve being effective in a second position to connect the additional control chamber associated with the third to fourth shift valve to said fluid pressure source and to connect the remainder of said additional control chambers to exhaust, said drive range selector valve being effective in a third position to connect all of said additional control chambers to said fluid pressure source, and driver operable control means for selectively placing said drive range control valve in any one of said three positions.

31. In a control system for a transmission having planetary gearing and having a plurality of fluid pressure responsive servo members operable to establish first, second, third, and fourth drive ratio, a fluid pressure source, means for controlling the admission of pressure to said servo members including a plurality of shift valves and a drive range selector valve, means connecting said drive range selector valve to said fluid pressure source, governor plungers associated with said shift valves, a speed responsive governor connected to said fluid pressure source and hydraulically connected to said governor plungers, said governor being constructed and arranged to deliver a variable pressure which increases in speed of rotation of said governor to said governor plungers, said governor pressure being operative upon said governor plungers to tend to upshift said shift valves to change the transmission drive ratio, additional control chambers associated with said shift valves, said drive range selector valve being effective in one position to connect all of said additional control chambers to exhaust, said drive range selector valve being movable to a second position to connect one of said additional control chambers to said fluid pressure source and the remainder of said additional control chambers to exhaust, said drive range selector valve being movable to a third position to connect all of said additional control chambers to said fluid pressure source, and driver operable control means for selectively positioning said drive range selector valve in any one of said three positions.

32. In a control system for a transmission having planetary gearing and having a plurality of fluid pressure responsive servo members operable to establish a plurality of drive ratios, a fluid pressure source, means for controlling the admission of fluid pressure to said servo members including a manually operable drive range selector valve and a plurality of shift valves, means connecting said drive range selector valve to said fluid pressure source, control chambers associated with each of said shift valves hydraulically connected to a speed responsive governor, means connecting said governor to said fluid pressure source, said governor being constructed and arranged to deliver a variable pressure which increases with speed of rotation of said governor to said control chambers, a manually operable pressure metering valve adapted to deliver a variable pressure to a delivery passage, means connecting said pressure metering valve to said fluid pressure source, control chambers associated with said shift valves hydraulically connectable to said variable pressure valve delivery passage, the pressure in said last mentioned control chambers acting upon said shift valves in opposition to said governor delivered pressure, additional control chambers associated with said shift valves and controlled by said drive range selector valve, said drive range selector valve being effective in one position to connect said additional control chambers to exhaust, said drive range selector valve being movable to a second position to connect one of said additional control chambers to said fluid pressure source and to connect the remainder of said additional control chambers to exhaust, said drive range selector valve being movable to a third position to connect all of said additional control chambers to said fluid pressure source, and driver operable control means for selectively placing said drive range selector valve in any one of said three positions.

33. In a control system for a transmission having planetary gearing and having a plurality of fluid pressure responsive servo members operable to selectively establish a plurality of drive ratios, a fluid pressure source, means for controlling the admission of fluid pressure to said servo members including a plurality of shift valves and a drive range selector valve, means connecting said drive range selector valve to said fluid pressure source, governor plungers associated with said shift valves, hydraulic governor means connected to said source for delivering variable pressure to said governor plungers to move said shift valves to establish different drive ratios, control chambers associated with said shift valves, a pressure metering valve connected to said fluid pressure source and operable to deliver a variable pressure to said control chambers, additional control chambers associated with said shift valves, said drive range selector valve being effective in one drive range position to connect all of said last mentioned additional control chambers to exhaust, said drive range selector valve being movable to a second position to connect one of said last mentioned additional control chambers to said fluid pressure source and the remainder of said last mentioned additional control chambers to exhaust, said drive range selector valve being movable to a third drive range position to connect all of said last mentioned additional control chambers to said fluid pressure source.

34. In a control system for a transmission having planetary gearing and having a plurality of fluid pressure responsive servo members operable to selectively establish a plurality of drive ratios, a fluid pressure source, means for controlling the admission of fluid pressure to said servo members including a plurality of shift valves and a drive range selector valve, means connecting said drive range selector valve to said fluid pressure source, speed responsive governor means connected to said fluid pressure source, control chambers associated with said shift valves hydraulically connected to said governor means, additional control chambers associated with said shift valves and controlled by said drive range selector valve, said drive range selector valve being effective in one drive range position to connect all of said additional control chambers to exhaust to permit said governor to shift said shift valves to change the transmission drive ratio from its lowest drive ratio to its highest drive ratio upon attainment of a predetermined governor speed, said drive range selector valve being effective in a second drive range position to direct fluid pressure from said source to one of said additional control chambers to delay shift of one of said transmission drive ratios until said governor attains a higher speed than said heretofore mentioned governor speed, said drive range selector valve being effective in a third position to direct fluid pressure to said one additional control chamber and to a second of said additional control chambers to delay the shift of two of said transmission drive ratios until said governor attains a higher speed than said first-mentioned governor speed, and driver operable means for placing said drive range selector valve in any one of said three positions.

References Cited in the file of this patent

UNITED STATES PATENTS

| | | |
|---|---|---|
| 1,619,701 | Chorlton | Mar. 1, 1927 |
| 2,071,292 | Woolson | Feb. 16, 1937 |
| 2,103,540 | Livermore | Dec. 28, 1937 |
| 2,193,304 | Thompson | Mar. 12, 1940 |
| 2,193,305 | Thompson | Mar. 12, 1940 |
| 2,204,872 | Thompson | June 18, 1940 |
| 2,208,643 | Neracher | July 23, 1940 |
| 2,221,393 | Carnegie | Nov. 12, 1940 |
| 2,530,200 | Hobbs | Nov. 14, 1950 |
| 2,566,380 | Svenson | Sept. 4, 1951 |
| 2,575,507 | Acton | Nov. 20, 1951 |
| 2,576,336 | Farkas | Nov. 27, 1951 |
| 2,577,660 | Krueger | Dec. 4, 1951 |
| 2,627,189 | McFarland | Feb. 3, 1953 |
| 2,630,895 | McFarland | Mar. 10, 1953 |
| 2,640,373 | Jandasek | June 2, 1953 |
| 2,667,085 | Ackerman | Jan. 26, 1954 |
| 2,693,260 | Lucia | Nov. 2, 1954 |
| 2,697,363 | Sheppard | Dec. 21, 1954 |

UNITED STATES PATENT OFFICE
CERTIFICATE OF CORRECTION

Patent No. 2,790,327

April 30, 1957

Walter B. Herndon

It is hereby certified that error appears in the printed specification of the above numbered patent requiring correction and that the said Letters Patent should read as corrected below.

Column 2, line 42, for "driving" read -- drive --; column 3, line 48, for "effixed" read -- affixed --; line 57, for "ad the" read -- and the --; column 4, line 2, for "rotation of" read -- rotation to --; line 44, for "end 11" read -- end 111 --; column 5, line 19, for "brake-applying" read -- brake-apply --; line 56, strike out the second occurrence of "156,"; column 6, line 24, for "the second gear ratio" read -- second gear speed ratio --; column 7, line 42, for "elevent" read -- eleven --; column 11, line 4, before "toward" insert -- down --; line 54, for "downshift valves" read -- downshift the shift valves --; column 12, line 33, for "which" read -- while --; column 13, line 37, for "retraded" read -- retarded --; column 18, line 43, after "valve" and before the period insert -- 310 --; column 24, lines 10 and 11, for "po-sion" read -- position --; column 25, line 65, for "with" read -- which --; column 30, line 61, for "delivered" read -- delivery --.

Signed and sealed this 8th day of October 1957.

(SEAL)
Attest:

KARL H. AXLINE
Attesting Officer

ROBERT C. WATSON
Commissioner of Patents